(12) United States Patent
Kawai et al.

(10) Patent No.: US 8,142,919 B2
(45) Date of Patent: Mar. 27, 2012

(54) BATTERY PACK APPARATUS WITH A PLURALITY OF MEDIUM FEEDING PARTS FOR ADJUSTING TEMPERATURE THEREOF

(75) Inventors: Hirokazu Kawai, Matsusaka (JP); Takaki Kobayashi, Nagoya (JP); Jun Okuda, Aichi-gun (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 1245 days.

(21) Appl. No.: 11/380,163

(22) Filed: Apr. 25, 2006

(65) Prior Publication Data

US 2006/0259817 A1 Nov. 16, 2006

(30) Foreign Application Priority Data

Apr. 27, 2005 (JP) ................................. 2005-130531

(51) Int. Cl.
*H01M 10/50* (2006.01)
*H01M 2/00* (2006.01)
(52) U.S. Cl. .......................................... 429/62; 429/163
(58) Field of Classification Search .................. 429/61, 429/62, 71; 714/14
See application file for complete search history.

(56) References Cited

U.S. PATENT DOCUMENTS 6,377,880 B1 * 4/2002 Kato et al. ...................... 701/29
6,903,534 B2 6/2005 Minamiura

FOREIGN PATENT DOCUMENTS

| JP | 9250497 | | 9/1997 |
| JP | 2000-242340 | | 9/2000 |
| JP | 2003041935 A | * | 2/2003 |
| JP | 2003-142167 | | 5/2003 |

* cited by examiner

*Primary Examiner* — Barbara Gilliam
*Assistant Examiner* — Stephan Essex
(74) *Attorney, Agent, or Firm* — Workman Nydegger

(57) ABSTRACT

A battery pack apparatus including at least one battery assembly, a plurality of medium feeding parts for adjusting temperatures of the battery assembly, at least one temperature detector, a storage unit, and a controller. The storage unit stores a relation between a temperature of the battery assembly and a revolution level of the medium feeding parts. The controller reads out a revolution level corresponding to the detected temperature of the battery assembly from the storage unit, and allocates the revolution level to the medium feeding parts. The controller changes the value of the revolution levels allocated to the respective medium feeding parts based on the allocated revolution levels so that any one of the revolution levels of the plurality of the medium feeding parts is different from the other revolution levels thereof, and controls the plurality of medium feeding parts at changed revolution levels.

3 Claims, 14 Drawing Sheets

Fig.2

REVOLUTION LEVEL DEFINITION TABLE 20

| REVOLUTION LEVEL | REVOLUTION PER UNIT OF TIME |
|---|---|
| 1 | LOW ↑ |
| 2 | |
| 3 | |
| 4 | ↓ |
| 5 | |
| 6 | HIGH |

Fig.3

TEMPERATURE-REVOLUTION LEVEL TABLE 21

| TEMPERATURE T1 OF BATTERY ASSEMBLY 10 | REVOLUTION LEVEL L FOR FANS 3-1 AND 3-2 |
|---|---|
| LOW ↑ | 1 |
| | 2 |
| | 3 |
| ↓ | 4 |
| HIGH | 5 |

Fig.7A

TEMPERATURE-REVOLUTION LEVEL TABLE 22

| TEMPERATURE T1 OF BATTERY ASSEMBLY 10-1 | REVOLUTION LEVEL L1 FOR FAN 3-1 |
|---|---|
| LOW ↑↓ HIGH | 1 |
| | 2 |
| | 3 |
| | 4 |
| | 5 |

Fig.7B

TEMPERATURE-REVOLUTION LEVEL TABLE 23

| TEMPERATURE T2 OF BATTERY ASSEMBLY 10-2 | REVOLUTION LEVEL L2 FOR FAN 3-2 |
|---|---|
| LOW ↑↓ HIGH | 1 |
| | 2 |
| | 3 |
| | 4 |
| | 5 |

TEMPERATURE-REVOLUTION LEVEL TABLE 24

| TEMPERATURE T3 OF BATTERY ASSEMBLY 10-3 | REVOLUTION LEVEL L3 FOR FAN 3-3 |
|---|---|
| LOW ↕ HIGH | 1 |
| | 2 |
| | 3 |
| | 4 |
| | 5 |

| | | | | |
|---|---|---|---|---|
| REVOLUTION LEVEL FOR FAN 3-1 | 3 | 3 | 4 | 3 |
| REVOLUTION LEVEL FOR FAN 3-2 | 3 | 4 | 3 | 3 |
| REVOLUTION LEVEL FOR FAN 3-3 | 4 | 3 | 3 | 4 |
| | FIRST PERIOD OF TIME | SECOND PERIOD OF TIME | THIRD PERIOD OF TIME | FIRST PERIOD OF TIME |

TIME

BATTERY PACK APPARATUS WITH A PLURALITY OF MEDIUM FEEDING PARTS FOR ADJUSTING TEMPERATURE THEREOF

BACKGROUND OF THE INVENTION

1. Field of the Invention

The present invention relates to a battery pack apparatus with a plurality of medium feeding parts for adjusting a temperature thereof. In particular, the present invention relates to a battery pack apparatus preventing all of the medium feeding parts from rotating at almost the same revolution.

2. Description of the Related Art

In recent years, in a battery pack apparatus with the battery assembly having a configuration in which a plurality of secondary batteries is connected in series, a calorific value on electric charging or discharging becomes larger as secondary batteries have a larger capacity and supply a larger current. For that reason, it is necessary to enhance a cooling capacity of an apparatus for cooling down the battery assembly in battery pack apparatus. In battery pack apparatus, when the cooling apparatus detects an increase of a temperature of the battery assembly by, for example, temperature-detecting elements or the like, the cooling apparatus makes fans or the like rotate to feed cooling air to the battery assembly and a neighborhood thereof to cool down at least a part of the battery assembly. In the case of the battery assembly with a high calorific value, a plurality of fans is provided for a single battery assembly. In the case of the battery pack apparatus having a plurality of battery assemblies, one or more fans are allocated for each battery assembly.

In the above-mentioned battery pack apparatus with a plurality of fans, peak frequencies of noises generated by the respective fans rotating at almost the same revolution are overlapped each other, which causes a large noise. According to a method for cooling an equipment of a prior art disclosed in the Japanese patent laid-open publication No. 2005-130531, two or more fans, all of which are the same type, are controlled at different revolutions from each other. This leads that the peak frequencies of noises generated by the respective fans are shifted to each other to be different from each other, and resulting in reduction in the noise.

However, in the cooling method of the prior art, there is a difference in cooling capacities of the fans controlled at different revolutions from each other, which feed cooling medium such as cooling air or cooling gas or the like. As a result, there is such a problem that the battery assembly, which is a cooling object, is not uniformly cooled down. In addition, there is another problem that the noise and the vibration are increased when a composite oscillation waveform generated by a plurality of fans rotating at different revolutions from each other corresponds to a resonance point oscillation waveform of a package, which packs the battery pack apparatus therein.

BRIEF SUMMARY OF THE INVENTION

Therefore, an essential object of the present invention is to solve the aforementioned problems, and to provide a battery pack apparatus, a method for adjusting temperature of battery pack, a program product and a computer-readable recording medium, capable of reducing the noise and the vibration in the battery pack apparatus with a plurality of medium feeding parts to adjust a temperature thereof.

In addition, another object of the present invention is to provide a battery pack apparatus, a method for adjusting temperature of battery pack, a program product and a computer-readable recording medium, capable of uniformly cooling down a cooling object or heating up a heating object.

According to the first aspect of the present invention, there is provided a battery pack apparatus including at least one battery assembly, a plurality of medium feeding parts, at least one temperature detector, a storage unit, and a controller. The battery assembly includes at least one secondary battery connected in series. The plurality of medium feeding parts feeds medium to at least one of the battery assembly and a neighborhood thereof to adjust a temperature of at least a part of the battery assembly. The temperature detector detects a temperature of the battery assembly. The storage unit stores a relation between a temperature of the battery assembly and a revolution level indicating a relative level of a revolution of the medium feeding parts. The controller receives the temperature of the battery assembly detected by the temperature detector, reads out a revolution level corresponding to the temperature of the battery assembly from the storage unit, and allocates the revolution level to the plurality of medium feeding parts. The controller changes the value of the revolution levels allocated to the respective medium feeding parts based on the allocated revolution levels so that any one of the revolution levels of the plurality of the medium feeding parts is different from the other revolution levels thereof, and controls the plurality of medium feeding parts at changed revolution levels.

The medium means air or non-flammable gas or the like for cooling down or heating up the battery assembly. The medium feeding part is typically a fan, a blower or the like, and feeds medium by rotation of a rotor. The revolution level means a predetermined range of revolution for the medium feeding parts, including a certain revolution. According to the configuration mentioned above, all of the medium feeding parts do not simultaneously rotate at the same revolution level. As a result, peak frequencies of noises generated by the respective fans are not overlapped each other, and a large noise is not generated. Therefore, according to the present invention, noise and vibration can be reduced in the battery pack apparatus with a plurality of medium feeding parts.

In addition, in the battery pack apparatus, when all of the revolution levels allocated to the respective medium feeding parts are substantially equal to each other, the controller changes the value of one of the all same revolution levels to another value that is different from the value of the all same revolution levels, and controls the plurality of medium feeding parts at changed revolution levels.

According to the configuration mentioned above, all of the medium feeding parts do not simultaneously rotate at the same revolution level. As a result, peak frequencies of noises generated by the respective fans are not overlapped each other, and a large noise is not generated. Therefore, according to the present invention, noise and vibration can be reduced in the battery pack apparatus with a plurality of medium feeding parts.

Further, in the battery pack apparatus, when all of the revolution levels allocated to the respective medium feeding parts are substantially equal to each other, the controller controls the plurality of medium feeding parts so that a revolution level that is different from the value of the all same revolution levels is sequentially selected in each predetermined time by at least one medium feeding part.

According to the configuration mentioned above, cooling or heating fluctuation of the battery assembly, which is a cooling object or a heating object, is prevented. Therefore, according to the present invention, in the battery pack apparatus with a plurality of medium feeding parts, noise and vibration can be reduced, and a cooling object or a heating object is uniformly cooled down or heated up to a certain temperature.

Still further, in the battery pack apparatus, when at least two of the revolution levels allocated to the respective medium feeding parts are substantially equal to each other, the controller changes the revolution levels so that the different revolution levels are selected by the respective medium feeding parts, and controls the plurality of medium feeding parts at the respective revolution levels.

According to the configuration mentioned above, the respective medium feeding parts rotate at the different revolution level from each other. As a result, peak frequencies of noises generated by the respective fans are not overlapped each other, and a large noise is not generated. Therefore, according to the present invention, noise and vibration can be reduced in the battery pack apparatus with a plurality of medium feeding parts.

In addition, in the battery pack apparatus, when at least two of the revolution levels allocated to the respective medium feeding parts are substantially equal to each other, the controller controls the plurality of medium feeding parts so that a different revolution levels from each other are sequentially selected in each predetermined time by the respective medium feeding parts.

According to the configuration mentioned above, cooling or heating fluctuation of the battery assembly, which is a cooling object or a heating object, is prevented. Therefore, according to the present invention, in the battery pack apparatus with a plurality of medium feeding parts, noise and vibration can be reduced, and a cooling object or a heating object is uniformly cooled down or heated up to a certain temperature.

Further, in the battery pack apparatus, the storage unit further stores a resonance point frequency of a package of the battery pack apparatus which packs at least one battery assembly therein. The controller controls the plurality of medium feeding parts at respective revolution levels so that an absolute value of a difference between oscillation frequencies of the medium feeding parts corresponding to the revolution levels of any two of the plurality of medium feeding parts is not included in a predetermined range including the resonance point frequency stored in the storage unit.

According to the configuration mentioned above, an absolute value of an oscillation frequency difference between the revolution levels of any two medium feeding parts does not correspond to a resonance point frequency of the package of the battery pack. As a result, beat can be reduced if the battery pack apparatus is combined with a package, and therefore, an increase of noise and vibration can be prevented.

According to the second aspect of the present invention, there is provided a method for adjusting temperature for a battery pack apparatus. The battery pack apparatus includes at least one battery assembly. The battery assembly includes at least one secondary battery connected in series. The battery pack apparatus also includes a plurality of medium feeding parts. The medium feeding parts feeds medium to at least one of the battery assembly and a neighborhood thereof to adjust a temperature of at least a part of the battery assembly. The method includes the steps of: storing in a storage unit a relation between a temperature of the battery assembly and a revolution level indicating a relative level of a revolution of the medium feeding parts; detecting the temperature of the battery assembly; reading out the revolution level corresponding to the detected temperature of the battery assembly from the storage unit; allocating the read-out revolution level to the plurality of medium feeding parts; changing the value of the revolution levels allocated to the respective medium feeding parts based on the allocated revolution levels so that any one of the revolution levels of the plurality of the medium feeding parts is different from the other revolution levels thereof; and controlling the plurality of medium feeding parts at changed revolution levels. The present invention can realize a method for adjusting temperature of battery pack having the same effect of the battery pack apparatus according to the first aspect of the present invention.

According to the third aspect of the present invention, there is provided a program product making a computer the above-mentioned method for adjusting temperature of battery pack. The present invention can realize a program product having the same effect of the battery pack apparatus according to the first aspect of the present invention.

According to the fourth aspect of the present invention, there is provided a computer-readable recording medium storing the above-mentioned program. The present invention can realize a computer-readable recording medium having the same effect of the battery pack apparatus according to the first aspect of the present invention.

The battery pack apparatus, the method for adjusting temperature of battery pack, the program product and the computer-readable recording medium according to the present invention can reduce noise and vibration in the battery pack apparatus with a plurality of medium feeding parts for adjusting a temperature thereof. The battery pack apparatus, the method for adjusting temperature of battery pack, the program product and the computer-readable recording medium according to the present invention can also uniformly cool down a cooling object or heat up a heating object.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 2 is a revolution level definition table 20 showing an example of a relation between a revolution level for fans 3-1 and 3-2 and revolution per unit of time;

FIG. 3 is a temperature-revolution level table 21 showing an example of a relation between a temperature T1 of a battery assembly 10 and a revolution level L for the fans 3-1 and 3-2;

FIG. 7A is a temperature-revolution level table 22 showing an example of a relation between a temperature T1 of a battery assembly 10-1 and a revolution level L1 for the fan 3-1;

FIG. 7B is a temperature-revolution level table 23 showing an example of a relation between a temperature T2 of a battery assembly 10-2 and a revolution level L2 for the fan 3-2;

It will be recognized that some or all of the figures are schematic representations for purposes of illustration and do not necessarily depict the actual relative sizes or locations of the elements shown.

DETAILED DESCRIPTION OF THE PREFERRED EMBODIMENTS

Preferred embodiments specifically exemplifying the best mode for carrying out the present invention will be described below referring to the accompanying drawings.

First Preferred Embodiment

Figure 1:
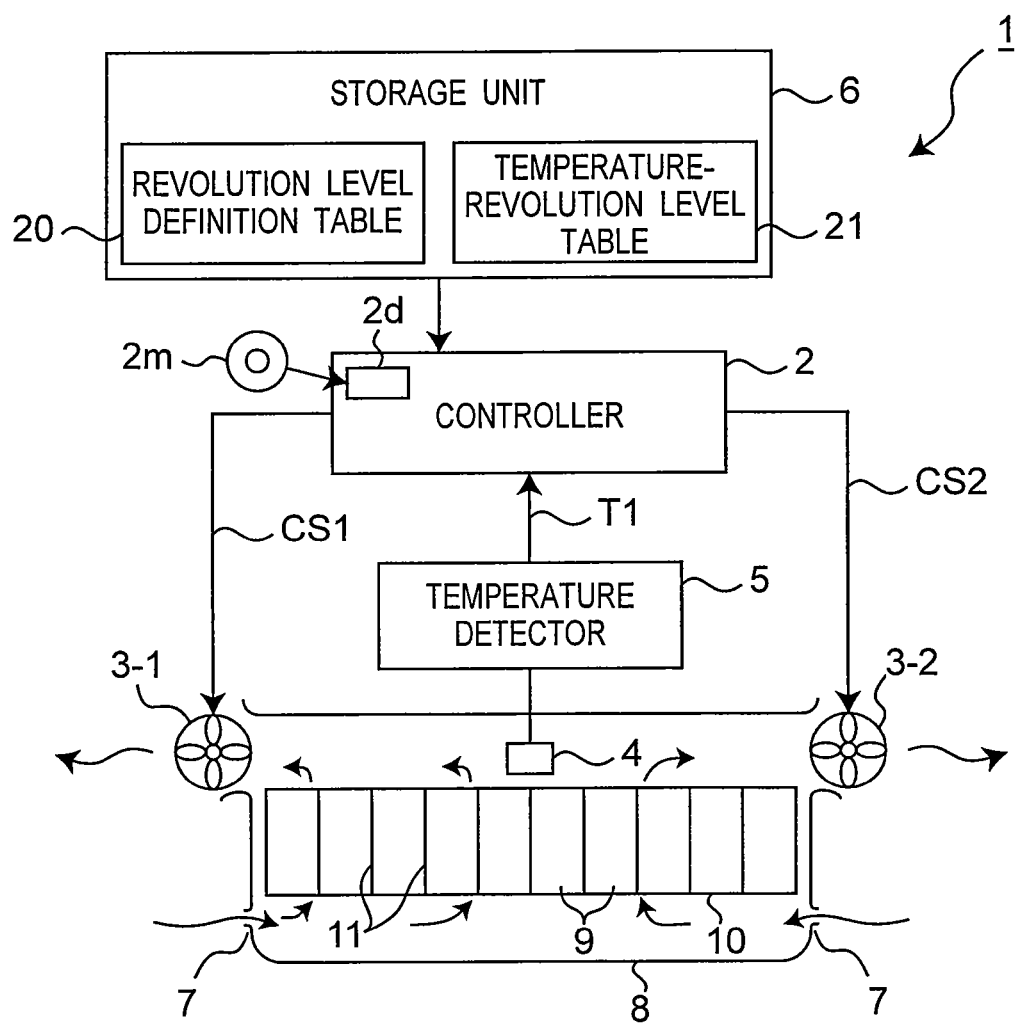
FIG. 1 is a block diagram showing a configuration of a battery pack apparatus 1 according to a first preferred embodiment.

Referring to FIGS. 1 to 5, a battery pack apparatus 1 according to a first preferred embodiment will be described below. FIG. 1 is a block diagram showing a configuration of the battery pack apparatus 1 according to the first preferred embodiment. FIG. 2 is a revolution level definition table 20 showing an example of a relation between a revolution level for fans 3-1 and 3-2 and revolution number (hereinafter, referred to as revolution) per unit of time. FIG. 3 is a temperature-revolution level table 21 showing an example of a relation between a temperature T1 of a battery assembly 10 and a revolution level L for the fans 3-1 and 3-2. In FIG. 1, the battery pack apparatus 1 is used as a high-voltage power supply for driving an electric vehicle.

Referring to FIG. 1, the battery pack apparatus 1 includes a controller 2, the fans 3-1 and 3-2, a temperature sensor 4, a temperature detector 5, a storage unit 6, a cover 8 and the battery assembly 10.

The battery assembly 10 has a configuration in which a plurality of battery blocks 9 is connected in series. Each battery block of the battery blocks 9 is configured by a plurality of secondary batteries connected in series. Paths 11 for passing cooling medium (hereinafter, referred to as cooling medium paths 11) are provided between the respective battery blocks 9.

The temperature sensor 4 is a temperature-detecting element such as a thermistor. The temperature sensor 4 detects the temperature of the battery assembly 10. The temperature detector 5 reads out the temperature of the battery assembly 10 detected by the temperature sensor 4 as a temperature T1, and outputs the temperature T1 to the controller 2. In FIG. 1, only one temperature sensor 4 is provided at a neighborhood of the center part of the battery assembly 10. However, a plurality of temperature sensors may be provided in order to compensate for a temperature difference in the battery assembly 10.

The fans 3-1 and 3-2 are medium feeding parts for feeding cooling medium (e.g. cooling air) to the battery assembly 10 and a neighborhood thereof to cool down the battery assembly 10. The fans 3-1 and 3-2 have the same number of blades having almost the same length as each other. The fans 3-1 and 3-2 have almost the same cooling capacities when rotating at the same revolution. The fans 3-1 and 3-2 are controlled by the controller 2 at one of six revolution levels, or revolution levels 1 to 6. The respective revolutions per unit of time are allocated to the revolution levels 1 to 6, respectively, as shown in FIG. 2. The revolution level shows whether the corresponding revolution per unit of time is relatively high or low. The revolution per unit of time corresponding to each revolution level is the lowest at the revolution level 1 (e.g. 500 rpm), and is the highest at the revolution level 6 (e.g. 5000 rpm). The fans 3-1 and 3-2 are driven to rotate at a rotating speed corresponding to one of the six revolution levels depending on control signals CS1 and CS2 from the controller 2, respectively.

The cover 8 is provided to pack the battery assembly 10 therein. The cover 8 forms a passage of cooling medium. The cover 8 includes a plurality of openings 7. As the fans 3-1 and 3-2 are driven to rotate, the cooling medium (e.g. cooling air) flows into the cover 8 from outside through the openings 7. The air flowed into the cover 8 passes the cooling medium paths 11 formed between the battery blocks 9 from the lower space of the cover 8 to the upper space of the cover 8, and passes between the blades of the rotating fans 3-1 and 3-2. Then, the air is exhausted to the outside of the cover 8. Since the temperature of the air flowed into the cover 8 from outside through the openings 7 is lower than that of the battery assembly 10, the battery assembly 10 is cooled down as the cooling air flows in the cover 8. The cooling medium may be other cooling non-flammable gas or the like, as well as the cooling air.

The storage unit 6 stores the revolution level definition table 20 of the relation between the revolution levels for the fans 3-1 and 3-2 and the revolution per unit of time as shown in FIG. 2, and the temperature-revolution level table 21 of the relation between the temperature T1 of the battery assembly 10 and the revolution level L for the fans 3-1 and 3-2 as shown in FIG. 3.

The controller 2 is, for example, a microcomputer. The controller 2 receives the temperature T1 of the battery assembly 10 from the temperature detector 5, and decides the optimum revolution level L for fans 3-1 and 3-2 depending on the temperature T1 of the battery assembly 10 using the temperature-revolution level table 21 of FIG. 3 stored in the storage unit 6. The controller 2 outputs the control signals CS1 and CS2 so that a first period of time in which the fans 3-1 and 3-2 are controlled at the revolution levels L and (L+1), respectively, and a second period of time in which the fans 3-1 and 3-2 are controlled at the revolution levels (L+1) and L, respectively, are switched over in each predetermined time. The controller 2 includes a drive unit 2d for reproducing a computer-readable recording medium 2m, such as a CD-ROM or the like, reads out a program stored in the computer-readable recording medium 2m, loads the read-out program onto a main memory of the controller 2, and executes a processing for controlling the fans shown in FIG. 5.

Figure 4:
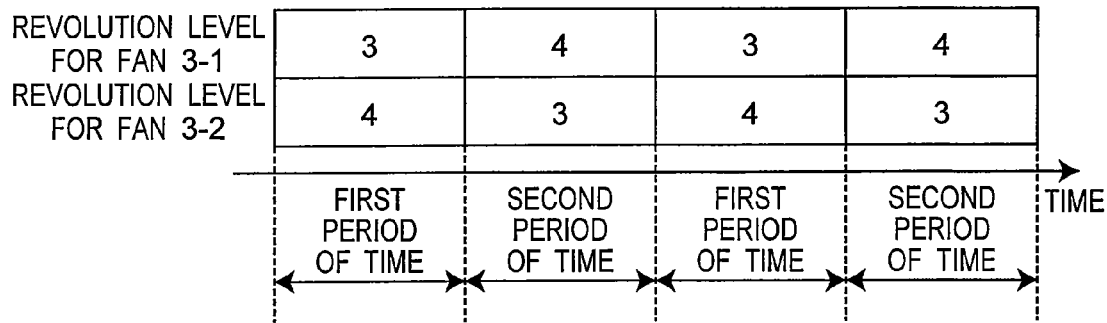
FIG. 4 is a time chart showing a switchover of the revolution levels for the fans 3-1 and 3-2 according to the first preferred embodiment.
Figure 5:
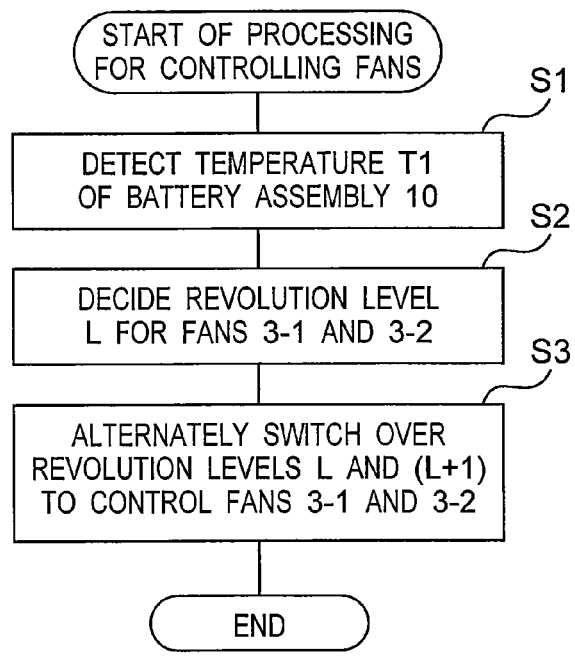
FIG. 5 is a flow chart showing a processing for controlling the fans 3-1 and 3-2 of the battery pack apparatus 1 according to the first preferred embodiment.

Referring to FIGS. 3 to 5, an operation of the battery pack apparatus 1 according to the first embodiment will be described below. FIG. 4 is a time chart showing a switchover of the revolution levels for the fans 3-1 and 3-2 according to the first preferred embodiment. FIG. 5 is a flow chart showing a processing for controlling the fans 3-1 and 3-2 of the battery pack apparatus 1 according to the first preferred embodiment.

At step S1 in FIG. 5, in the battery pack apparatus 1 on electric charging (or on electric discharging), the temperature detector 5 reads out the temperature T1 of the battery assembly 10 detected by the temperature sensor 4. At step S2, the controller 2 decides the optimum revolution level L for the fans 3-1 and 3-2 depending on the temperature T1 of the battery assembly 10 using the temperature-revolution level table 21 of FIG. 3. At step S3, the controller 2 switches over a first period of time in which the fans 3-1 and 3-2 are controlled at the revolution levels L and (L+1), respectively, and a second period of time in which the fans 3-1 and 3-2 are controlled at the revolution levels (L+1) and L, respectively, in each predetermined time.

For example, when the optimum revolution level L corresponding to the temperature T1 of the battery assembly 10, which is decided at step S2 of FIG. 5, is "3", a first period of time in which the fans 3-1 and 3-2 are controlled at the revolution level "3" and "4", respectively, and a second period of time in which the fans 3-1 and 3-2 are controlled at the revolution level "4" and "3", respectively, are switched over in each predetermined time.

According to the above-mentioned configuration, in the battery pack apparatus 1 having two fans 3-1 and 3-2 for a single battery assembly 10, the fans 3-1 and 3-2 do not rotate at the same revolution level. As a result, peak frequencies of noises generated by the respective fans 3-1 and 3-2 are not overlapped each other, and a large noise is not generated. In addition, since the fans 3-1 and 3-2 are alternately controlled at the revolution levels L and (L+1), the cooling capacities of the fans 3-1 and 3-2 are almost the same.

Therefore, according to the battery pack apparatus 1 of the first preferred embodiment, in the battery pack apparatus 1 with a plurality of fans, the noise and the vibration can be reduced, and the battery assembly 10, which is the cooling object, is uniformly cooled down.

In addition, in the first preferred embodiment, the controller 2 decides the optimum revolution level L for the fans 3-1 and 3-2 depending on the temperature T1 of the battery assembly 10, and switches the fans 3-1 and 3-2 over at the revolution levels L and (L+1) in each predetermined time. However, the present invention does not intend to limit to this operation. It is noted that the fans 3-1 and 3-2 may be switched over, for example, at the revolution levels L and (L−1), or at the revolution levels (L−1) and (L+1), or at other combination of the revolution levels. When the revolution levels for the fans 3-1 and 3-2 are different from each other and when the revolution levels are switched over in each predetermined time, the same effect as the first preferred embodiment can be obtained.

Second Preferred Embodiment

Figure 6:
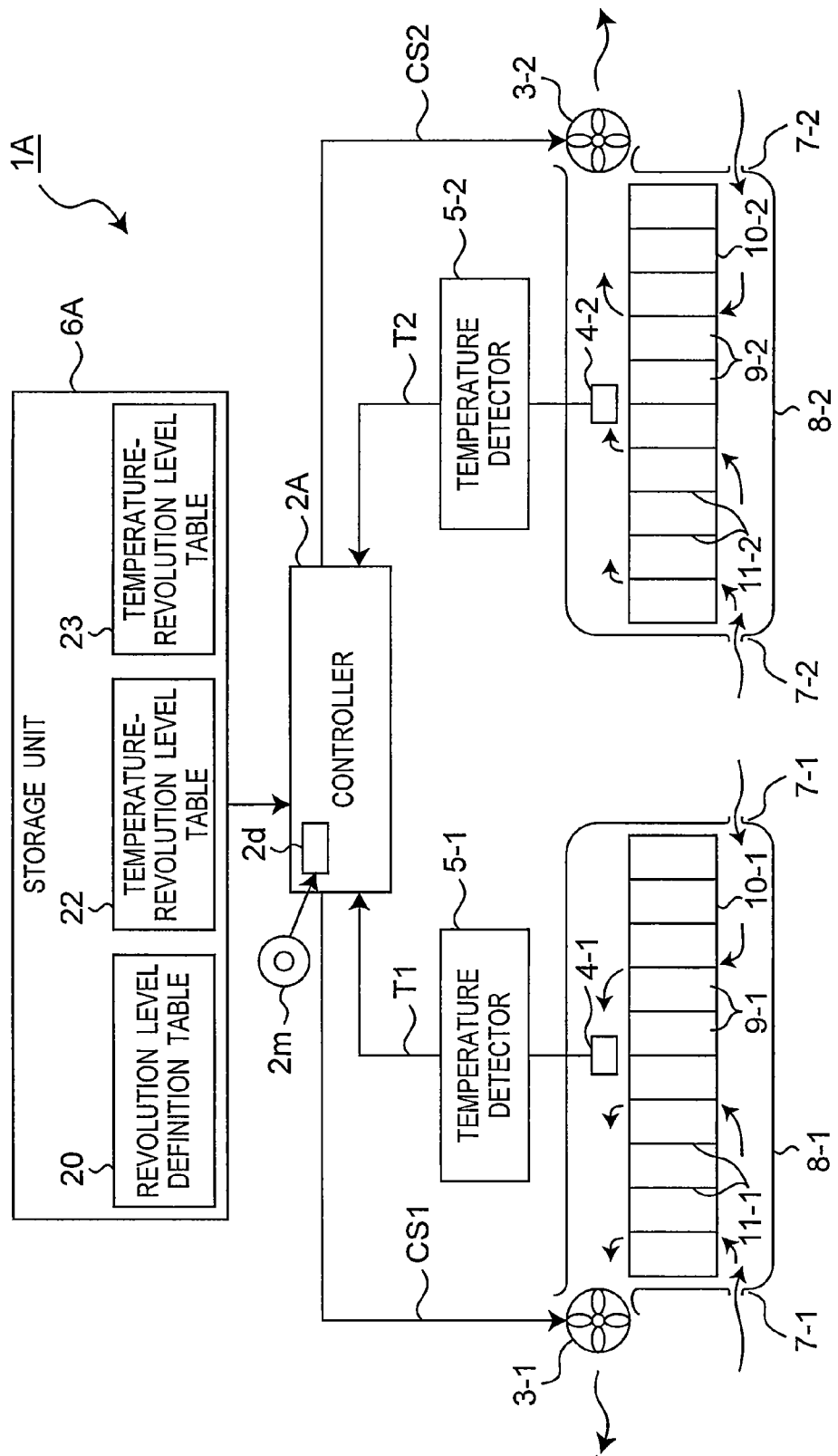
FIG. 6 is a block diagram showing a configuration of a battery pack apparatus 1A according to a second preferred embodiment.

Referring to FIGS. 2, 6 to 8, a battery pack apparatus 1A according to a second preferred embodiment will be described below. FIG. 6 is a block diagram showing a configuration of the battery pack apparatus 1A according to the second preferred embodiment. FIG. 7A is a temperature-revolution level table 22 showing an example of a relation between a temperature T1 of a battery assembly 10-1 and a revolution level L1 for the fan 3-1. FIG. 7B is a temperature-revolution level table 23 showing an example of a relation between a temperature T2 of a battery assembly 10-2 and a revolution level L2 for a fan 3-2. In FIG. 6, the battery pack apparatus 1A is used as a high-voltage power supply for driving an electric vehicle.

Referring to FIG. 6, the battery pack apparatus 1A includes a controller 2A, the fans 3-1 and 3-2, temperature sensors 4-1 and 4-2, temperature detectors 5-1 and 5-2, a storage unit 6A, covers 8-1 and 8-2 and the battery assemblies 10-1 and 10-2.

The battery assembly 10-1 has a configuration in which a plurality of battery blocks 9-1 is connected in series. The battery assembly 10-2 has a configuration in which a plurality of battery blocks 9-2 is connected in series. Each battery block of the battery blocks 9-1 and 9-2 is configured by a plurality of secondary batteries connected in series, respectively. Paths 11-1 and 11-2 for passing cooling medium (hereinafter, referred to as cooling medium paths 11-1 and 11-2) are provided between the battery blocks 9-1 and 9-2, respectively.

The temperature sensors 4-1 and 4-2 are temperature-detecting elements such as thermistors. The temperature sensors 4-1 and 4-2 detect the temperatures of the battery assemblies 10-1 and 10-2, respectively. The temperature detectors 5-1 and 5-2 read out the temperatures of the battery assemblies 10-1 and 10-2 detected by the temperature sensors 4-1 and 4-2 as temperatures T1 and T2, respectively, and output the temperatures T1 and T2 to the controller 2A, respectively. In FIG. 6, only one temperature sensor 4-1 is provided at a neighborhood of the center part of battery assembly 10-1, and only one temperature sensor 4-2 is provided at a neighborhood of the center part of battery assembly 10-2. However, a plurality of temperature sensors may be provided for each single battery assembly in order to compensate for a temperature difference in the single battery assembly.

The fans 3-1 and 3-2 are medium feeding parts for feeding cooling medium (e.g. cooling air) to the battery assemblies 10-1 and 10-2 and a neighborhood thereof to cool down the battery assemblies 10-1 and 10-2, respectively. Since the configurations of the fans 3-1 and 3-2 have been already described in the first preferred embodiment in detail, the detailed descriptions about the configurations of the fans 3-1 and 3-2 are omitted here.

The covers 8-1 and 8-2 are provided to pack the battery assemblies 10-1 and 10-2 therein, respectively. The covers 8-1 and 8-2 form passages of cooling medium. The cover 8-1 includes a plurality of openings 7-1. The cover 8-2 also includes a plurality of openings 7-2. As the fan 3-1 is driven to rotate, the cooling medium (e.g. cooling air) flows into the cover 8-1 from outside through the openings 7-1. The air flowed into the cover 8-1 passes the cooling medium paths 11-1 formed between the battery blocks 9-1 from the lower space of the cover 8-1 to the upper space of the cover 8-1, passes between the blades of the rotating fan 3-1. Then, the air is exhausted to the outside of the cover 8-1. Since the temperature of the air flowed into the cover 8-1 from outside through the openings 7-1 is lower than that of the battery assembly 10-1, the battery assembly 10-1 is cooled down as the cooling air flows in the cover 8-1. Since the configuration of the cover 8-2 is the same as that of the cover 8-1, the descriptions about the configuration of cover 8-2 are omitted here. The cooling medium may be other cooling non-flammable gas or the like, as well as the cooling air.

The storage unit 6A stores the revolution level definition table 20 of the relation between the revolution levels for the fans 3-1 and 3-2 and the revolution per unit of time as shown in FIG. 2, and the temperature-revolution level table 22 of the relation between the temperature T1 of the battery assembly 10-1 and the revolution level L1 for the fan 3-1 as shown in FIG. 7A, and the temperature-revolution level table 23 of the relation between the temperature T2 of the battery assembly 10-2 and the revolution level L2 for the fan 3-2 as shown in FIG. 7B.

The controller 2A is, for example, a microcomputer. The controller 2A receives the temperature T1 of the battery assembly 10-1 from the temperature detector 5-1, and decides the optimum revolution level L1 for fan 3-1 depending on the temperature T1 of the battery assembly 10-1 using the temperature-revolution level table 22 of FIG. 7A stored in the storage unit 6A. The controller 2A also receives the temperature T2 of the battery assembly 10-2 from the temperature detector 5-2, and decides the optimum revolution level L2 for fan 3-2 depending on the temperature T2 of the battery assembly 10-2 using the temperature-revolution level table 23 of FIG. 7B stored in the storage unit 6A.

Further, when the revolution level L1 for the fan 3-1 and the revolution level L2 for the fan 3-2 are equal to each other, the controller 2A outputs the control signals CS1 and CS2 so that a first period of time in which the fans 3-1 and 3-2 are controlled at the revolution levels L1 (=L2) and (L1+1), respectively, and a second period of time in which the fans 3-1 and 3-2 are controlled at the revolution levels (L1+1) and L1, respectively, are switched over in each predetermined time. On the other hand, when the revolution level L1 for the fan 3-1 and the revolution level L2 for the fan 3-2 are different from each other, the controller 2A outputs the control signals CS1 and CS2 to control the fans 3-1 and 3-2 at the revolution level L1 and L2, respectively. The controller 2A includes a drive unit 2d for reproducing a computer-readable recording medium 2m, such as a CD-ROM or the like, reads out a program stored in the computer-readable recording medium 2m, loads the read-out program onto a main memory of the controller 2A, and executes a processing for controlling the fans shown in FIG. 8.

Figure 8:
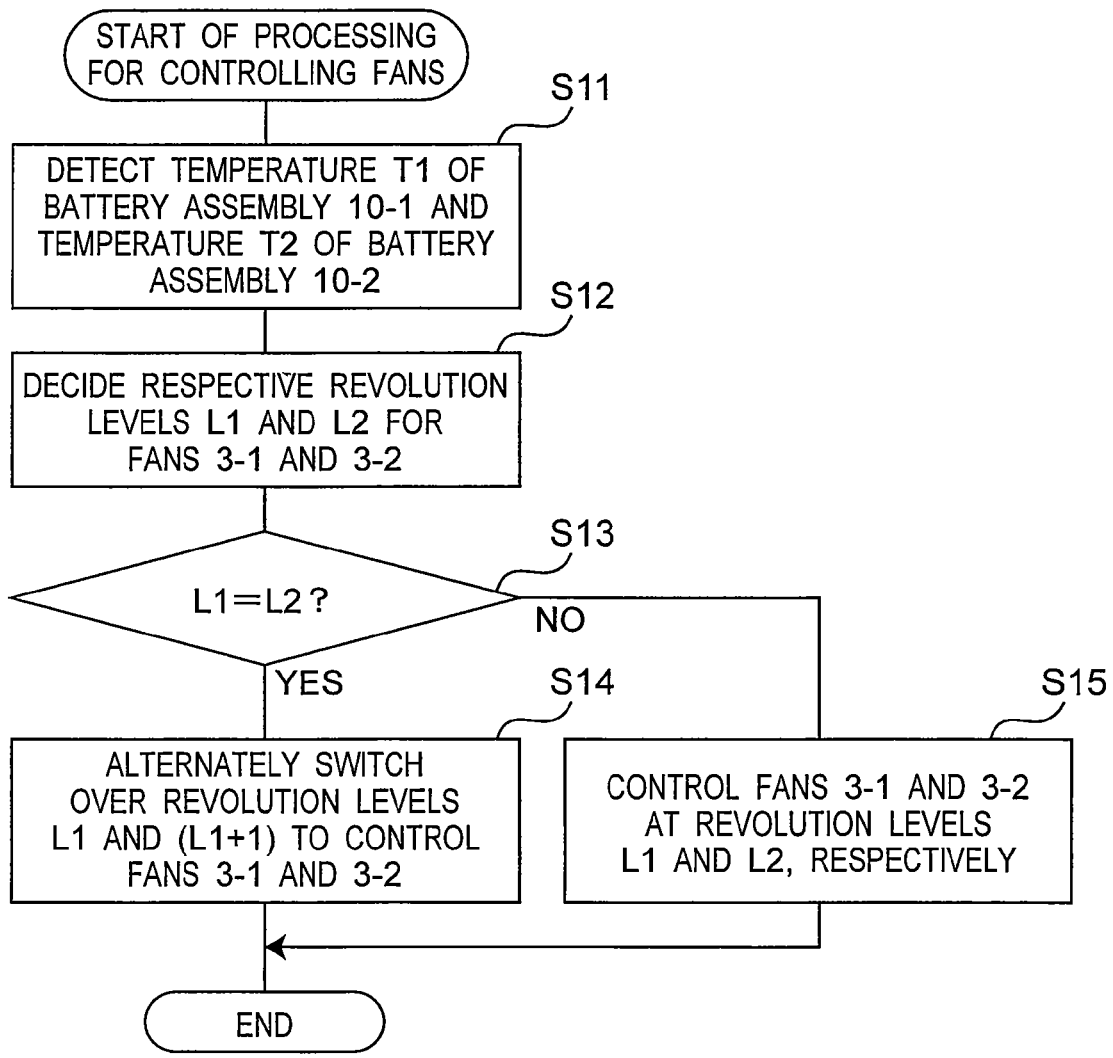
FIG. 8 is a flow chart showing a processing for controlling the fans 3-1 and 3-2 of the battery pack apparatus 1A according to the second preferred embodiment.

Referring to FIGS. 7 and 8, an operation of the battery pack apparatus 1A according to the second embodiment will be described below. FIG. 8 is a flow chart showing a processing for controlling the fans 3-1 and 3-2 of the battery pack apparatus 1A according to the second preferred embodiment.

At step S11 in FIG. 8, in the battery pack apparatus 1A on electric charging (or on electric discharging), the temperature detector 5-1 reads out the temperature T1 of the battery assembly 10-1 detected by the temperature sensor 4-1. The temperature detector 5-2 reads out the temperature T2 of the battery assembly 10-2 detected by the temperature sensor 4-2. At step S12, the controller 2A decides the optimum revolution level L1 for the fan 3-1 depending on the temperature T1 of the battery assembly 10-1 using the temperature-revolution level table 22 of FIG. 7A. The controller 2A also decides the optimum revolution level L2 for the fan 3-2 depending on the temperature T2 of the battery assembly 10-2 using the temperature-revolution level table 23 of FIG. 7B. At step S13, the controller 2A judges whether or not the revolution level L1 for the fan 3-1 and the revolution level L2 for the fan 3-2 are equal to each other. If YES at step S13, the control flow proceeds to step S14. On the other hand, if NO at step S13, the control flow proceeds to step S15.

At step S14, the controller 2A switches over a first period of time in which the fans 3-1 and 3-2 are controlled at the revolution levels L1 (=L2) and (L1+1), respectively, and a second period of time in which the fans 3-1 and 3-2 are controlled at the revolution levels (L1+1) and L1, respectively, in each predetermined time. At step S15, the controller 2A drives the fans 3-1 and 3-2 at the revolution level L1 and L2, respectively.

According to the above-mentioned configuration, in the battery pack apparatus 1A having one fan for each of the two battery assemblies 10-1 and 10-2, the fans 3-1 and 3-2 do not rotate at the same revolution level. As a result, peak frequencies of noises generated by the respective fans 3-1 and 3-2 are not overlapped each other, and a large noise is not generated. In addition, since the fans 3-1 and 3-2 are alternately controlled at the revolution levels L1 and (L1+1) when the optimum revolution levels L1 and L2 for the fans 3-1 and 3-2 corresponding to the temperatures T1 and T2, respectively, are equal to each other, the cooling capacities of the fans 3-1 and 3-2 are almost the same.

Therefore, according to the battery pack apparatus 1A of the second preferred embodiment, in the battery pack apparatus 1A with a plurality of fans, the noise and the vibration can be reduced, and the battery assemblies 10-1 and 10-2, which are the cooling objects, are uniformly cooled down.

In addition, in the second preferred embodiment, the controller 2A decides the optimum revolution levels L1 and L2 for the fans 3-1 and 3-2 depending on the temperatures T1 and T2 of the battery assemblies 10-1 and 10-2, respectively, and switches the fans 3-1 and 3-2 over at the revolution levels L1 and (L1+1) in each predetermined time. However, the present invention does not intend to limit to this operation. It is noted that the fans 3-1 and 3-2 may be switched over, for example, at the revolution levels L1 and (L1−1), or at the revolution levels (L1−1) and (L1+1), or at other combination of the revolution levels. When the revolution levels for the fans 3-1 and 3-2 are different from each other and when the revolution levels are switched over in each predetermined time, the same effect as the first preferred embodiment can be obtained.

Third Preferred Embodiment

Figure 9:
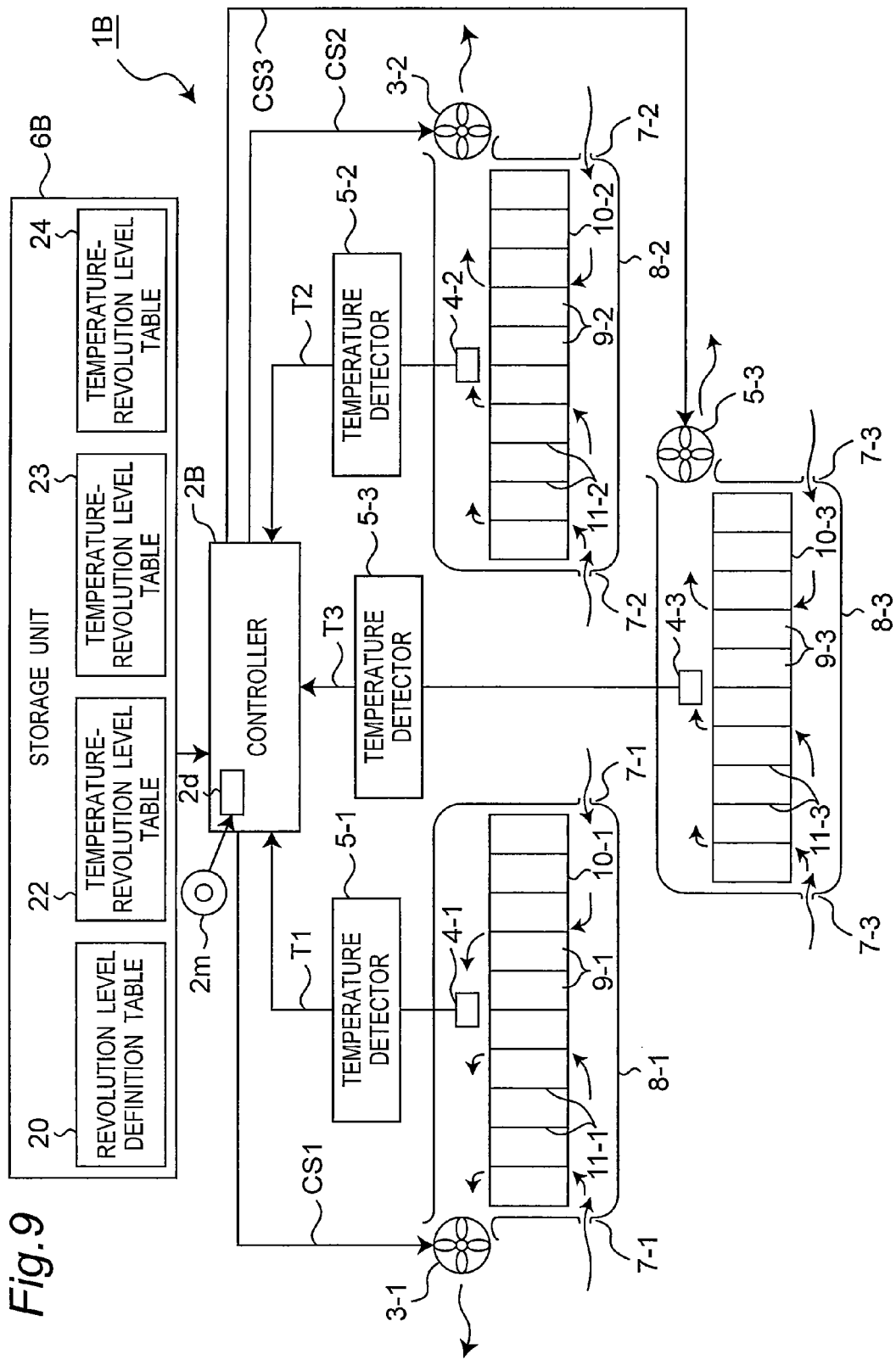
FIG. 9 is a block diagram showing a configuration of a battery pack apparatus 1B according to a third preferred embodiment.
Figures 10, 11:
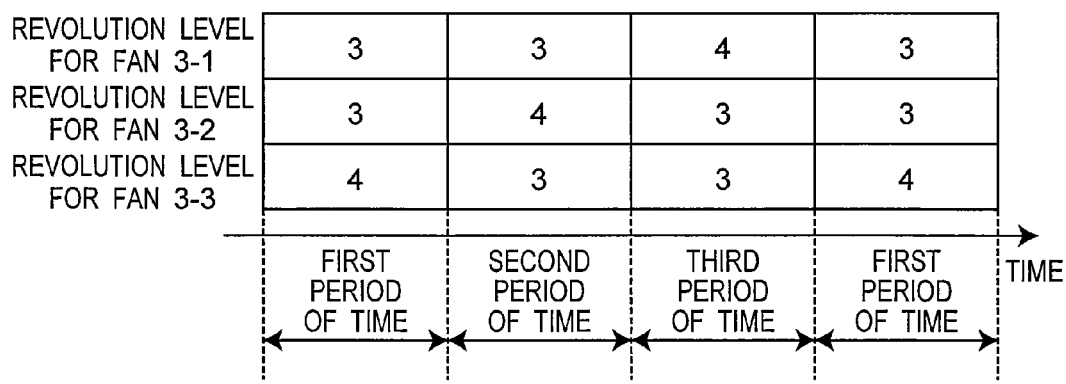
FIG. 10 is a temperature-revolution level table 24 showing an example of a relation between a temperature T3 of a battery assembly 10-3 and a revolution level L3 for a fan 3-3.
FIG. 11 is a time chart showing a switchover of the revolution levels for the fans 3-1, 3-2 and 3-3 according to the third preferred embodiment.

Referring to FIGS. 2, 7A, 7B, 9 to 12, a battery pack apparatus 1B according to a third preferred embodiment will be described below. FIG. 9 is a block diagram showing a configuration of the battery pack apparatus 1B according to the third preferred embodiment. FIG. 10 is a temperature-revolution level table 24 showing an example of a relation between a temperature T3 of a battery assembly 10-3 and a revolution level L3 for a fan 3-3. In FIG. 9, the battery pack apparatus 1B is used as a high-voltage power supply for driving an electric vehicle.

Referring to FIG. 9, the battery pack apparatus 1B is different from the battery pack apparatus 1A of FIG. 6 according to the second preferred embodiment in that a battery assembly 10-3, a fan 3-3, a temperature detector 5-3, a temperature sensor 4-3 and a cover 8-3 are further provided, that a controller 2B is provided instead of the controller 2A, and that a storage unit 6B is provided instead of the storage unit 6A. In other respects, the configuration is similar to that of the second preferred embodiment shown in FIG. 6, components similar or equivalent to those of the second preferred embodiment are designated by the same numeral references as those in FIG. 6, and their descriptions are omitted.

The battery assembly 10-3 has a configuration in which a plurality of battery blocks 9-3 is connected in series. Each battery block of the battery blocks 9-3 is configured by a plurality of secondary batteries connected in series. Paths 11-3 for passing cooling medium (hereinafter, referred to as cooling medium paths 11-3) are provided between the respective battery blocks 9-3.

The temperature sensor 4-3 is a temperature-detecting element such as a thermistor. The temperature sensor 4-3 detects the temperature of the battery assembly 10-3. The temperature detector 5-3 reads out the temperature of the battery assembly 10-3 detected by the temperature sensor 4-3 as a temperature T3, and output the temperature T3 to the controller 2B. In FIG. 9, only one temperature sensor 4-3 is provided at a neighborhood of the center part of the battery assembly 10-3. However, a plurality of temperature sensors may be provided for the battery assembly 10-3 in order to compensate for a temperature difference in the battery assembly.

The cover 8-3 is provided to pack the battery assembly 10-3 therein. The cover 8-3 forms a passage of cooling medium. The cover 8-3 includes a plurality of openings 7-3. Since the configuration of the cover 8-3 is the same as those of the covers 8-1 and 8-2 described in the second preferred embodiment, the descriptions about the configuration of cover 8-3 are omitted here.

The storage unit 6B stores the revolution level definition table 20 of the relation between the revolution levels for the fans 3-1 to 3-3 and the revolution per unit of time as shown in FIG. 2, and the temperature-revolution level table 22 of the relation between the temperature T1 of the battery assembly 10-1 and the revolution level L1 for the fan 3-1 as shown in FIG. 7A, the temperature-revolution level table 23 of the relation between the temperature T2 of the battery assembly 10-2 and the revolution level L2 for the fan 3-2 as shown in FIG. 7B, and the temperature-revolution level table 24 of the relation between the temperature T3 of the battery assembly 10-3 and the revolution level L3 for the fan 3-3 as shown in FIG. 10.

The controller 2B is, for example, a microcomputer. The controller 2B receives the temperature T1 of the battery assembly 10-1 from the temperature detector 5-1, and decides the optimum revolution level L1 for fan 3-1 depending on the temperature T1 of the battery assembly 10-1 using the temperature-revolution level table 22 of FIG. 7A stored in the storage unit 6B. The controller 2B also receives the temperature T2 of the battery assembly 10-2 from the temperature detector 5-2, and decides the optimum revolution level L2 for fan 3-2 depending on the temperature T2 of the battery assembly 10-2 using the temperature-revolution level table 23 of FIG. 7B stored in the storage unit 6B. The controller 2B further receives the temperature T3 of the battery assembly 10-3 from the temperature detector 5-3, and decides the optimum revolution level L3 for fan 3-3 depending on the temperature T3 of the battery assembly 10-3 using the temperature-revolution level table 24 of FIG. 10 stored in the storage unit 6B.

Further, when all of the revolution level L1 for the fan 3-1, the revolution level L2 for the fan 3-2, and the revolution level L3 for the fan 3-3 are equal to each other, the controller 2B outputs the control signals CS1, CS2 and CS3 to sequentially switch over a first period of time in which the fans 3-1 and 3-2 are controlled at the revolution level L1 (=L2=L3), and the fan 3-3 is controlled at the revolution level (L1+1), a second period of time in which the fans 3-1 and 3-3 are controlled at the revolution level L1, and the fan 3-2 is controlled at the revolution level (L1+1), and a third period of time in which the fans 3-2 and 3-3 are controlled at the revolution level L1, and the fan 3-1 is controlled at the revolution level (L1+1), in each predetermined time. On the other hand, when at least one of the revolution levels L1, L2 and L3 for the fans 3-1, 3-2 and 3-3 is different from the other, the controller 2B outputs the control signals CS1, CS2 and CS3 to control the fans 3-1, 3-2 and 3-3 at the revolution levels L1, L2 and L3, respectively. The controller 2B includes a drive unit 2d for reproducing a computer-readable recording medium 2m, such as a CD-ROM or the like, reads out a program stored in the computer-readable recording medium 2m, loads the read-out program onto a main memory of the controller 2B, and executes a processing for controlling the fans shown in FIG. 12.

Figure 12:
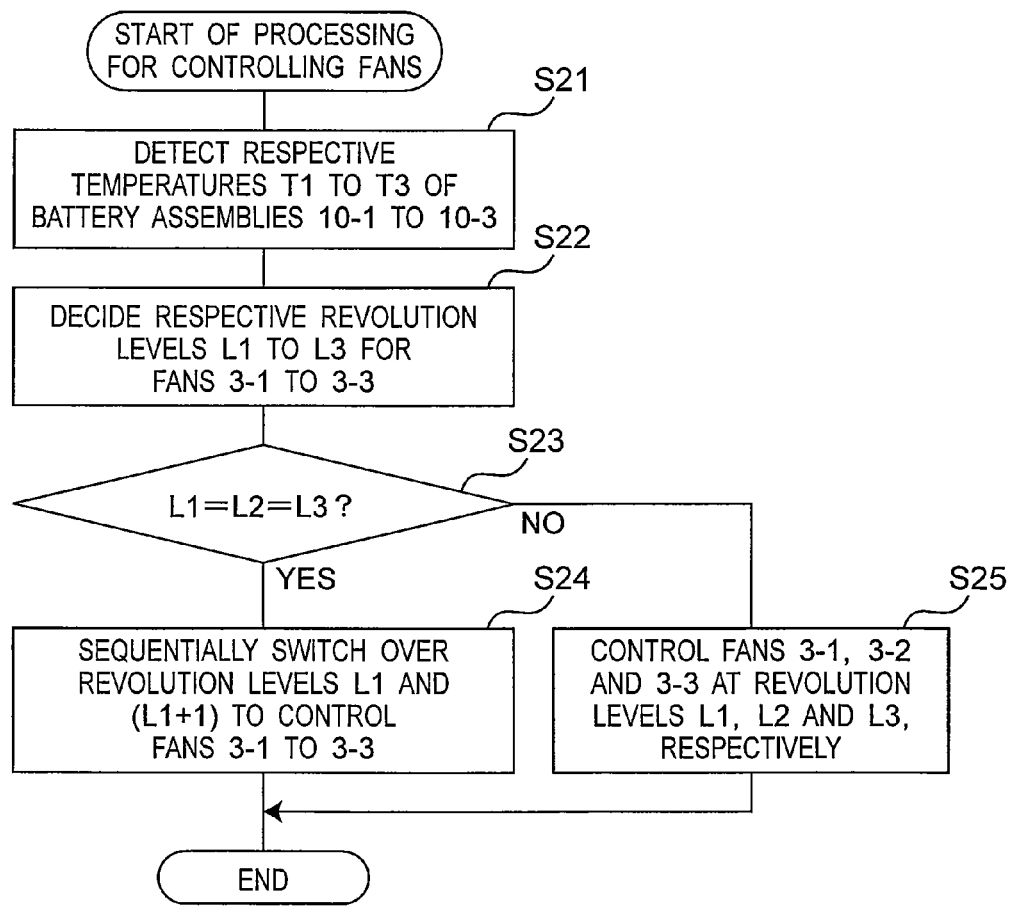
FIG. 12 is a flow chart showing a processing for controlling the fans 3-1, 3-2 and 3-3 of the battery pack apparatus 1B according to the third preferred embodiment.

Referring to FIGS. 7A, 7B, 10 to 12, an operation of the battery pack apparatus 1B according to the third embodiment will be described below. FIG. 11 is a time chart showing a switchover of the revolution levels for the fans 3-1, 3-2 and 3-3 according to the third preferred embodiment. FIG. 12 is a flow chart showing a processing for controlling the fans 3-1, 3-2 and 3-3 of the battery pack apparatus 1B according to the third preferred embodiment.

At step S21 in FIG. 12, in the battery pack apparatus 1B on electric charging (or on electric discharging), the temperature detector 5-1 reads out the temperature T1 of the battery assembly 10-1 detected by the temperature sensor 4-1. The temperature detector 5-2 reads out the temperature T2 of the battery assembly 10-2 detected by the temperature sensor 4-2. The temperature detector 5-3 reads out the temperature T3 of the battery assembly 10-3 detected by the temperature sensor 4-3. At step S22, the controller 2B decides the optimum revolution level L1 for the fan 3-1 depending on the temperature T1 of the battery assembly 10-1 using the temperature-revolution level table 22 of FIG. 7A. The controller 2B also decides the optimum revolution level L2 for the fan 3-2 depending on the temperature T2 of the battery assembly 10-2 using the temperature-revolution level table 23 of FIG. 7B. The controller 2B further decides the optimum revolution level L3 for the fan 3-3 depending on the temperature T3 of the battery assembly 10-3 using the temperature-revolution level table 24 of FIG. 10. At step S23, the controller 2B judges whether or not all of the revolution level L1 for the fan 3-1, the revolution level L2 for the fan 3-2, and the revolution level L3 for the fan 3-3 are equal to each other. If YES at step S23, the control flow proceeds to step S24. On the other hand, if NO at step S23, the control flow proceeds to step S25.

At step S24, the controller 2B sequentially switches over a first period of time in which the fans 3-1 and 3-2 are controlled at the revolution level L1 (=L2=L3), and the fan 3-3 is controlled at the revolution level (L1+1), a second period of time in which the fans 3-1 and 3-3 are controlled at the revolution level L1, and the fan 3-2 is controlled at the revolution level (L1+1), and a third period of time in which the fans 3-2 and 3-3 are controlled at the revolution level L1, and the fan 3-1 is controlled at the revolution level (L1+1), in each predetermined time.

For example, when all of the optimum revolution levels L1 to L3 for the fans 3-1 to 3-3, which are decided at step S22 of FIG. 12, are "3", the first period of time in which the fans 3-1, 3-2 and 3-3 are controlled at the revolution levels "3", "3" and "4", respectively, the second period of time in which the fans 3-1, 3-2 and 3-3 are controlled at the revolution levels "3", "4" and "3", respectively, and the third period of time in which the fans 3-1, 3-2 and 3-3 are controlled at the revolution levels "4", "3" and "3", respectively, are sequentially switched over in each predetermined time.

At step S25, the controller 2B drives the fans 3-1, 3-2 and 3-3 at the revolution levels L1, L2 and L3, respectively.

According to the above-mentioned configuration, in the battery pack apparatus 1B having one fan for each of the three battery assemblies 10-1 to 10-3, all of the fans 3-1 to 3-3 do not rotate at the same revolution level. As a result, peak frequencies of noises generated by the respective fans 3-1 to 3-3 are not overlapped each other, and a large noise is not generated. In addition, since the fans 3-1 to 3-3 are sequentially controlled at the revolution levels L1 and (L1+1) when all of the optimum revolution levels L1, L2 and L3 for the fans 3-1, 3-2 and 3-3 corresponding to the temperatures T1, T2 and T3, respectively, are equal to each other, the cooling capacities of the fans 3-1, 3-2 and 3-3 are almost the same.

Therefore, according to the battery pack apparatus 1B of the second preferred embodiment, in the battery pack apparatus 1B with a plurality of fans, the noise and the vibration can be reduced, and the battery assemblies 10-1, 10-2 and 10-3, which are the cooling objects, are uniformly cooled down.

In addition, in the third preferred embodiment, the controller 2B decides the optimum revolution levels L1 to L3 for the fans 3-1 to 3-3 depending on the temperatures T1 to T3 of the battery assemblies 10-1 to 10-3, respectively, and sequentially switches the fans 3-1 to 3-3 over at the revolution levels L1 and (L1+1) in each predetermined time. However, the present invention does not intend to limit to this operation. It is noted that the fans 3-1 to 3-3 may be switched over, for example, at the revolution levels L1 and (L1−1), or at the revolution levels (L1−1) and (L1+1), or at other combination of the revolution levels. When at least one of the revolution levels for the fans 3-1 to 3-3 is different from the other and when the revolution levels are sequentially switched over in each predetermined time, the same effect as the first preferred embodiment can be obtained.

Fourth Preferred Embodiment

Figure 13:
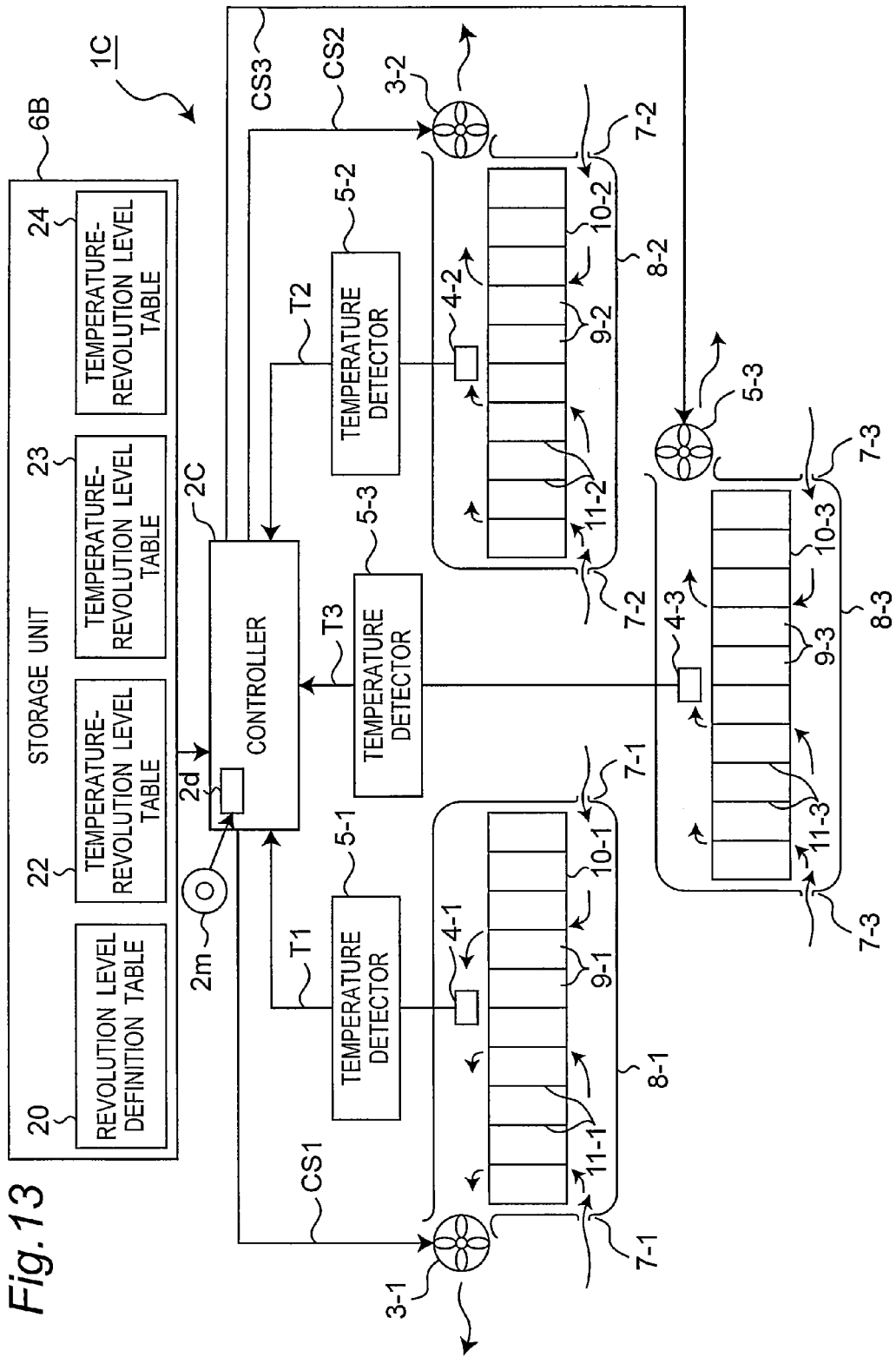
FIG. 13 is a block diagram showing a configuration of a battery pack apparatus 1C according to a fourth preferred embodiment.

Referring to FIGS. 7A, 7B, 13 to 15, a battery pack apparatus 1C according to a fourth preferred embodiment will be described below. FIG. 13 is a block diagram showing a configuration of the battery pack apparatus 1C according to the fourth preferred embodiment. In FIG. 13, the battery pack apparatus 1C is used as a high-voltage power supply for driving an electric vehicle.

Referring to FIG. 13, the battery pack apparatus 1C is different from the battery pack apparatus 1B of FIG. 9 according to the third preferred embodiment in that a controller 2C is provided instead of the controller 2B. In other respects, the configuration is similar to that of the third preferred embodiment shown in FIG. 9, components similar or equivalent to those of the third preferred embodiment are designated by the same numeral references as those in FIG. 9, and their descriptions are omitted.

The controller 2C is, for example, a microcomputer. The controller 2C receives the temperatures T1 to T3 of the battery assemblies 10-1 to 10-3 from the temperature detectors 5-1 to 5-3, respectively, and decides the optimum revolution levels L1 to L3 for fans 3-1 to 3-3 depending on the temperatures T1 to T3 using the temperature-revolution level tables of FIGS. 7A, 7B and 10 stored in the storage unit 6B, respectively. The operations of the controller 2C are the same as those of the controller 2B of FIG. 9 according to the third preferred embodiment so far.

Further, when at least two of the revolution levels L1 to L3 of the fans 3-1 to 3-3 are equal to each other, the controller 2C re-decides the revolution levels L1 to L3 so that the revolution levels L1 to L3 satisfy the relation of L1≠L2≠L3. The controller 2C then outputs the control signals CS1 to CS3 so that a first period of time in which the fans 3-1, 3-2 and 3-3 are controlled at the re-decided revolution levels L1, L2 and L3, respectively, a second period of time in which the fans 3-1, 3-2 and 3-3 are controlled at the re-decided revolution levels L2, L3 and L1, respectively, and a third period of time in which the fans 3-1, 3-2 and 3-3 are controlled at the re-decided revolution levels L3, L1 and L2, respectively, are switched over in each predetermined time. On the other hand, when all of the revolution levels L1, L2 and L3 for the fans 3-1, 3-2 and 3-3 are different from each other, the controller 2C outputs the control signals CS1, CS2 and CS3 to control the fans 3-1, 3-2 and 3-3 at the revolution levels L1, L2 and L3, respectively. The controller 2C includes a drive unit 2d for reproducing a computer-readable recording medium 2m, such as a CD-ROM or the like, reads out a program stored in the computer-readable recording medium 2m, loads the read-out program onto a main memory of the controller 2C, and executes a processing for controlling the fans shown in FIG. 15.

In addition, the number of the revolution levels for each fan previously stored in the storage unit 6B is equal to or larger than the number of the fans.

Figure 14:
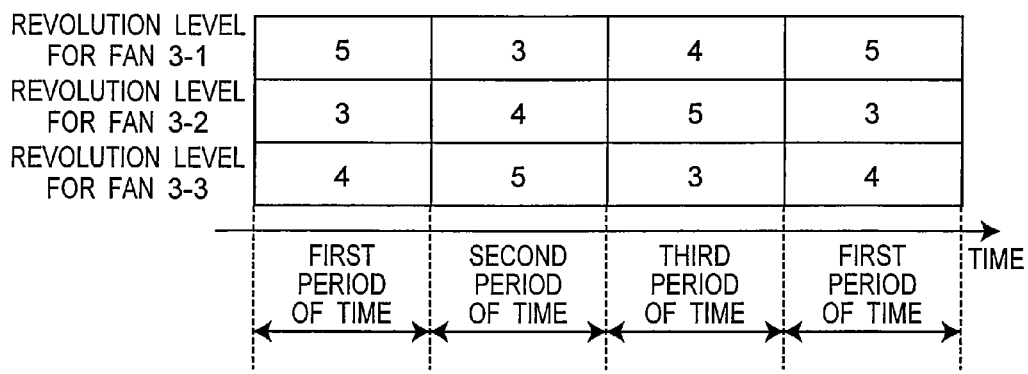
FIG. 14 is a time chart showing a switchover of the revolution levels for the fans 3-1, 3-2 and 3-3 according to the fourth preferred embodiment.
Figure 15:
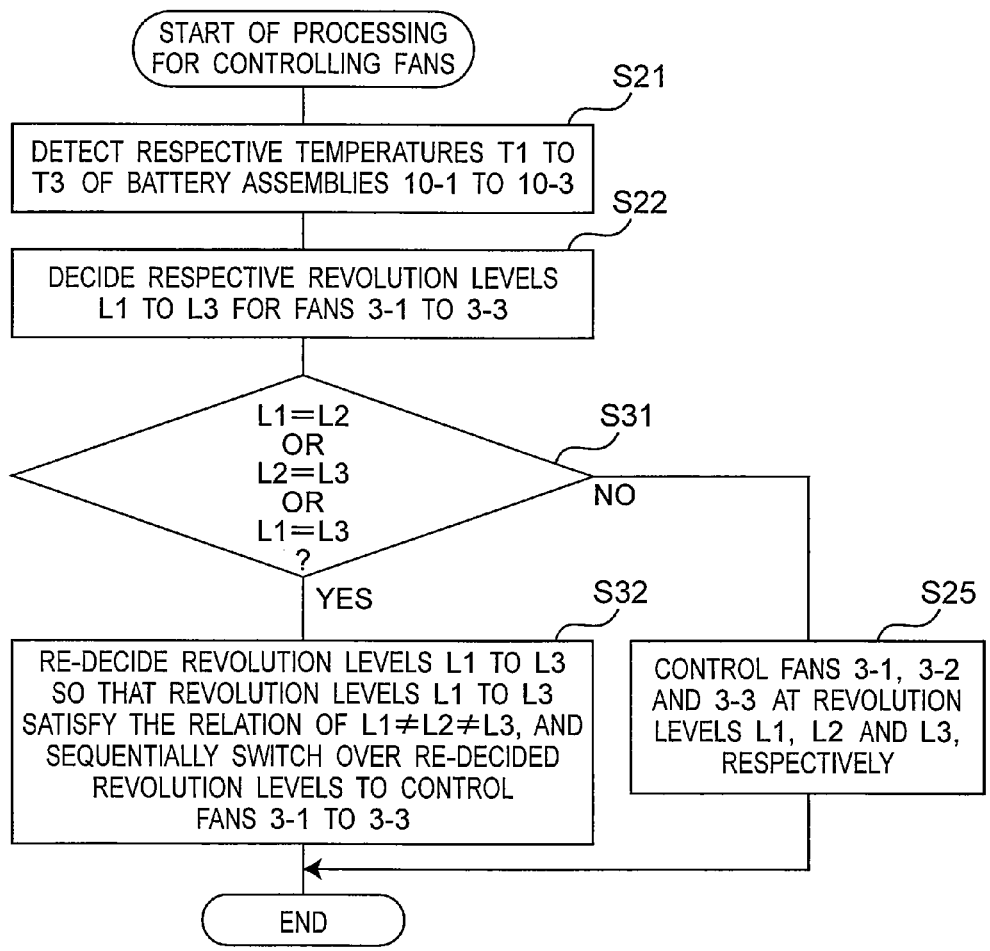
FIG. 15 is a flow chart showing a processing for controlling the fans 3-1, 3-2 and 3-3 of the battery pack apparatus 3-1, 3-2 and 3-3 according to the fourth preferred embodiment.

Referring to FIGS. 14 and 15, an operation of the battery pack apparatus 1C according to the fourth embodiment will be described below. FIG. 14 is a time chart showing a switchover of the revolution levels for the fans 3-1, 3-2 and 3-3 according to the fourth preferred embodiment. FIG. 15 is a flow chart showing a processing for controlling the fans 3-1, 3-2 and 3-3 of the battery pack apparatus 1C according to the fourth preferred embodiment.

At step S21 in FIG. 15, in the battery pack apparatus 1C on electric charging (or on electric discharging), the temperature detector 5-1 reads out the temperature T1 of the battery assembly 10-1 detected by the temperature sensor 4-1. The temperature detector 5-2 reads out the temperature T2 of the battery assembly 10-2 detected by the temperature sensor 4-2. The temperature detector 5-3 reads out the temperature T3 of the battery assembly 10-3 detected by the temperature sensor 4-3. At step S22, the controller 2C decides the optimum revolution level L1 for the fan 3-1 depending on the temperature T1 of the battery assembly 10-1 using the temperature-revolution level table 22 of FIG. 7A. The controller 2C also decides the optimum revolution level L2 for the fan 3-2 depending on the temperature T2 of the battery assembly 10-2 using the temperature-revolution level table 23 of FIG. 7B. The controller 2C further decides the optimum revolution level L3 for the fan 3-3 depending on the temperature T3 of the battery assembly 10-3 using the temperature-revolution level table 24 of FIG. 10. The processings of the controller 2C are the same as those of the controller 2B of FIG. 9 according to the third embodiment as shown in FIG. 12 so far.

At step S31, the controller 2C judges whether or not at least two of the revolution level L1 for the fan 3-1, the revolution level L2 for the fan 3-2, and the revolution level L3 for the fan 3-3 are equal to each other. If YES at step S31, the control flow proceeds to step S32. On the other hand, if NO at step S31, the control flow proceeds to step S25.

At step S32, the controller 2C re-decides the revolution levels L1 to L3 so that the revolution levels L1 to L3 satisfy the relation of L1≠L2≠L3. The controller 2C then sequentially switches over a first period of time in which the fans 3-1, 3-2 and 3-3 are controlled at the re-decided revolution levels L1, L2 and L3, respectively, a second period of time in which the fans 3-1, 3-2 and 3-3 are controlled at the re-decided revolution levels L2, L3 and L1, respectively, and a third period of time in which the fans 3-1, 3-2 and 3-3 are controlled at the re-decided revolution levels L3, L1 and L2, respectively, are switched over in each predetermined time. As a typical method for re-deciding the revolution levels L1 to L3 so that the revolution levels L1 to L3 satisfy the relation of L1≠L2≠L3, there is provided, for example, a method for removing a selected revolution level before sequentially deciding the next revolution level, and the like.

For example, when the optimum revolution levels L1 and L2 for the fans 3-1 and 3-2, which are decided at step S22 of FIG. 15, are "3", and the optimum revolution level L3 for the fan 3-3 is "4", the revolution levels L1 to L3 are re-decided to the revolution levels "5", "4" and "3", respectively. Then, as shown in FIG. 14, the first period of time in which the fans 3-1, 3-2 and 3-3 are controlled at the revolution levels "5", "3" and "4", respectively, the second period of time in which the fans 3-1, 3-2 and 3-3 are controlled at the revolution levels "3", "4" and "5", respectively, and the third period of time in which the fans 3-1, 3-2 and 3-3 are controlled at the revolution levels "4", "5" and "3", respectively, are sequentially switched over in each predetermined time.

At step S25, the controller 2C drives the fans 3-1, 3-2 and 3-3 at the revolution levels L1, L2 and L3, respectively.

According to the above-mentioned configuration, in the battery pack apparatus 1C having one fan for each of the three battery assemblies 10-1 to 10-3, all of the fans 3-1 to 3-3 rotate at the different revolution level from each other. As a result, peak frequencies of noises generated by the respective fans 3-1 to 3-3 are not overlapped each other, and a large noise is not generated. In addition, the cooling capacities of the fans 3-1, 3-2 and 3-3 are almost the same, since the revolution levels L1 to L3 are re-decided so that the revolution levels L1 to L3 satisfy the relation of L1≠L2≠L3, and the fans 3-1 to 3-3 are sequentially controlled at the re-decided revolution levels L1 to L3 when at least two of the optimum revolution levels L1, L2 and L3 for the fans 3-1, 3-2 and 3-3 corresponding to the temperatures T1, T2 and T3, respectively, are equal to each other.

Therefore, according to the battery pack apparatus 1C of the second preferred embodiment, in the battery pack apparatus 1C with a plurality of fans, the noise and the vibration can be reduced, and the battery assemblies 10-1, 10-2 and 10-3, which are the cooling objects, are uniformly cooled down.

Fifth Preferred Embodiment

Figure 16:
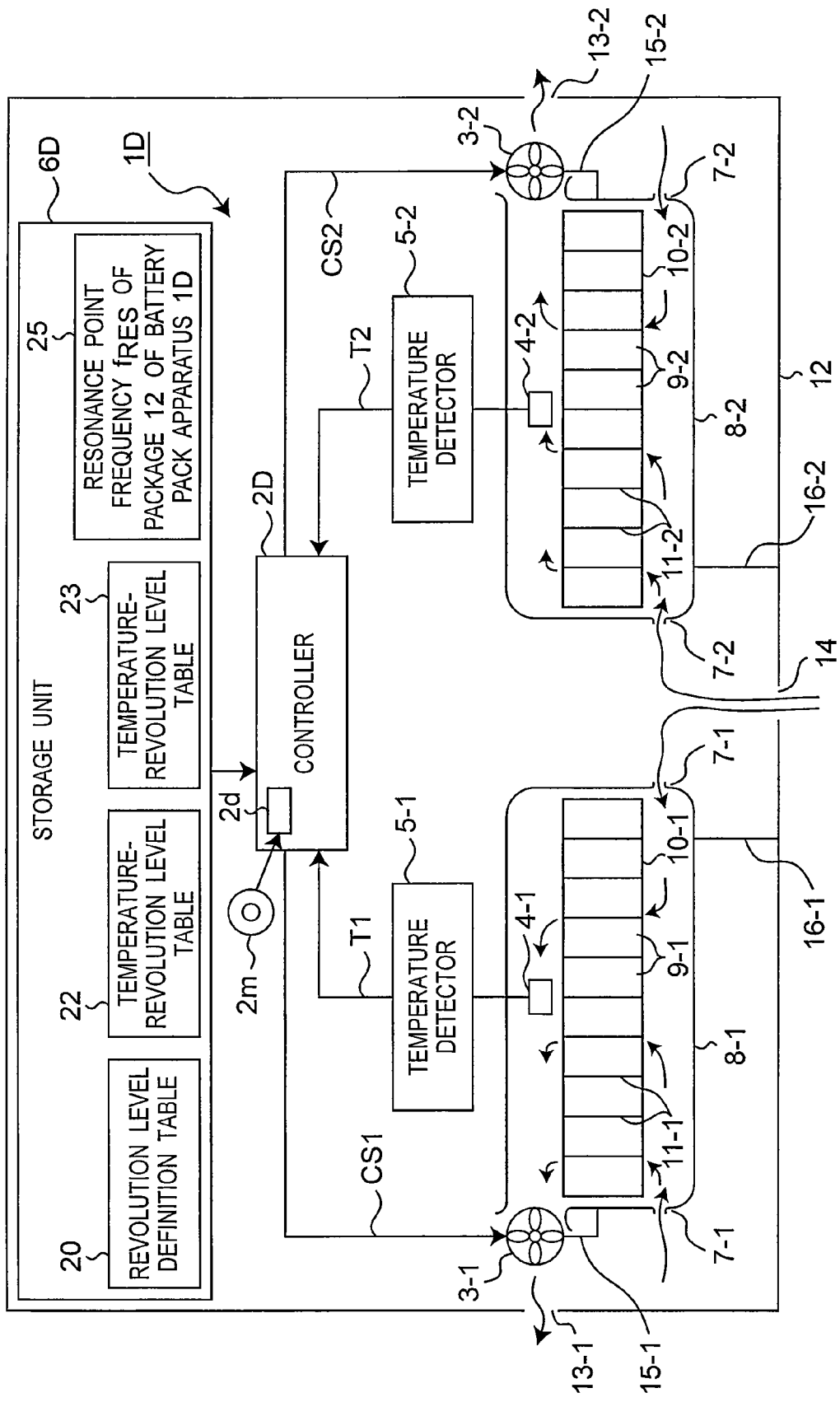
FIG. 16 is a block diagram showing a configuration of a battery pack apparatus 1D according to a fifth preferred embodiment.

Referring to FIGS. 2, 7A, 7B, 16 to 18, a battery pack apparatus 1D according to a fifth preferred embodiment will be described below. FIG. 16 is a block diagram showing a configuration of the battery pack apparatus 1D according to the fifth preferred embodiment. In FIG. 16, the battery pack apparatus 1D is used as a high-voltage power supply for driving an electric vehicle.

Referring to FIG. 16, the battery pack apparatus 1D is different from the battery pack apparatus 1A of FIG. 6 according to the second preferred embodiment in that a controller 2D is provided instead of the controller 2A, and that a storage unit 6D is provided instead of the storage unit 6A. In addition, the battery pack apparatus 1D according to the fifth preferred embodiment is packed in a package 12. In other respects, the configuration is similar to that of the second preferred embodiment shown in FIG. 6, components similar or equivalent to those of the second preferred embodiment are designated by the same numeral references as those in FIG. 6, and their descriptions are omitted.

The package 12 includes an opening 14 for taking the cooling medium into the package 12, and openings 13-1 and 13-2 for exhausting the cooling medium exhausted from the fans 3-1 and 3-2 to the outside of the package 12, respectively. The covers 8-1 and 8-2 packing the battery assemblies 10-1 and 10-2 therein, respectively, are fixedly joined to the package 12 with fixing members 16-1 and 16-2, such as screws or the like. The fans 3-1 and 3-2 are fixedly joined to the covers 8-1 and 8-2 with fixing members 15-1 and 15-2, such as screws or the like, respectively. According to this configuration, the vibration generated by the rotation of the fans 3-1 and 3-2 is propagated to the package 12 through the covers 8-1 and 8-2, respectively.

The storage unit 6D stores the revolution level definition table 20 of the relation between the revolution levels for the fans 3-1 and 3-2 and the revolution per unit of time as shown in FIG. 2, and the temperature-revolution level table 22 of the relation between the temperature T1 of the battery assembly 10-1 and the revolution level L1 for the fan 3-1 as shown in FIG. 7A, the temperature-revolution level table 23 of the relation between the temperature T2 of the battery assembly 10-2 and the revolution level L2 for the fan 3-2 as shown in FIG. 7B, and a resonance point frequency $f_{RES}$ of the package 12.

The controller 2D is, for example, a microcomputer. The controller 2D receives the temperature T1 of the battery assembly 10-1 from the temperature detector 5-1, and decides the optimum revolution level L1 for fan 3-1 depending on the temperature T1 of the battery assembly 10-1 using the temperature-revolution level table 22 of FIG. 7A stored in the storage unit 6D. The controller 2D also receives the temperature T2 of the battery assembly 10-2 from the temperature detector 5-2, and decides the optimum revolution level L2 for fan 3-2 depending on the temperature T2 of the battery assembly 10-2 using the temperature-revolution level table 23 of FIG. 7B stored in the storage unit 6D. The controller 2D calculates an absolute value $f_{diff}$ of a difference between an oscillation frequency $f_1$ generated by the rotation of the fan 3-1 and an oscillation frequency $f_2$ generated by the rotation of the fan 3-2 using the following equations (1), (2) and (3). In addition, in the following equations, N denotes the number of the blades of each fan, and C1 and C2 denote the revolutions corresponding to the revolution levels L1 and L2 for the fans 3-1 and 3-2, respectively.

$$f_1 = C1 \times N \qquad (1)$$

$$f_2 = C2 \times N \qquad (2)$$

$$f_{diff} = |f_1 - f_2| \qquad (3)$$

The controller 2D reads out the resonance point frequency $f_{RES}$ of the package 12 from the storage unit 6D and compares the resonance point frequency $f_{RES}$ with the value $f_{diff}$ obtained from the equations (1), (2) and (3). When the resonance point frequency $f_{RES}$ of the package 12 is equal to the value $f_{diff}$, the controller 2D re-decides one of the revolution levels L1 and L2 to the other revolution level, which satisfies the relation of $f_{RES} \neq f_{diff}$. The controller 2D includes a drive unit 2d for reproducing a computer-readable recording medium 2m, such as a CD-ROM or the like, reads out a program stored in the computer-readable recording medium 2m, loads the read-out program onto a main memory of the controller 2D, and executes a processing for controlling the fans shown in FIG. 18.

Figure 17A:
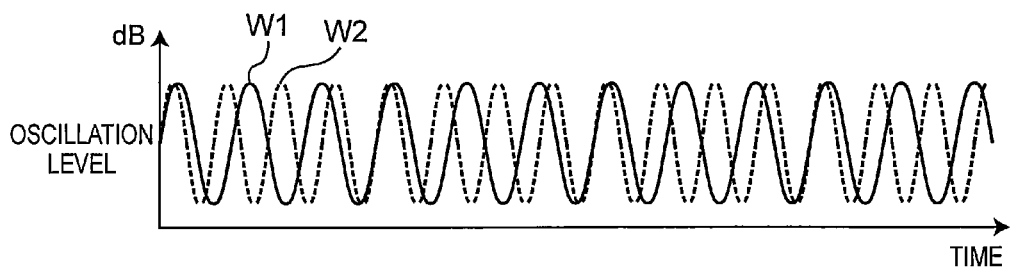
FIG. 17A is a diagram showing respective oscillation waveforms for fans 3-1 and 3-2 that are driven at different revolution levels according to a fifth preferred embodiment.
Figure 17B:
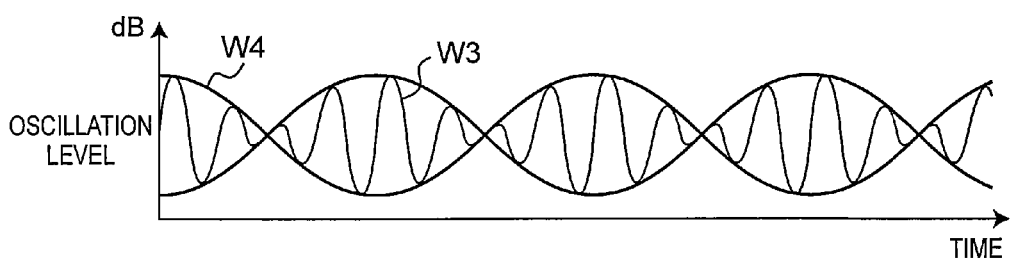
FIG. 17B is a diagram showing a composite waveform of two oscillation waveforms of FIG. 17A.
Figure 17C:
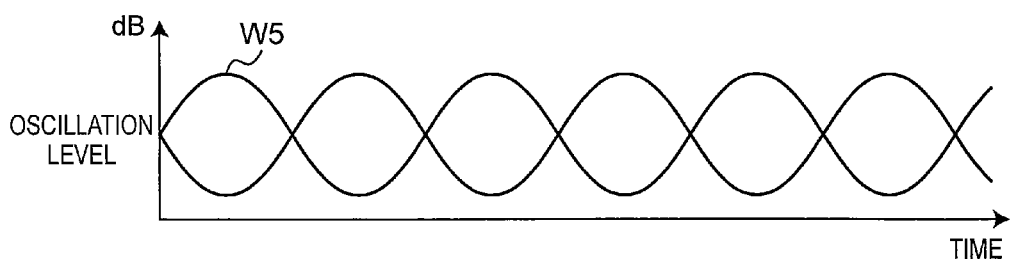
FIG. 17C is a diagram showing a resonance point oscillation waveform of a package, which packs the battery pack apparatus 1D therein.

Referring to FIGS. 17A, 17B, 17C and 18, an operation of the battery pack apparatus 1D according to the fifth embodiment will be described below. FIG. 17A is a diagram showing respective oscillation waveforms for fans 3-1 and 3-2 that are driven at different revolution levels. FIG. 17B is a diagram showing a composite waveform of two oscillation waveforms of FIG. 17A. FIG. 17C is a diagram showing a resonance point oscillation waveform of the package 12. In FIG. 17A, an oscillation waveform W1 depicted as solid line is an oscillation waveform (having a frequency $f_1$) generated by the rotation of the fan 3-1. An oscillation waveform W2 depicted as broken line is an oscillation waveform (having a frequency $f_2$) generated by the rotation of the fan 3-2.

When the oscillation waveform W1 is presented as $A \sin \phi_1$ (A denotes an amplitude, and $\phi_1$ denotes a phase, which is proportional to the frequency $f_1$ of the oscillation waveform W1), and the oscillation waveform W2 is presented as $A \sin \phi_2$ (A denotes an amplitude, and $\phi_2$ denotes a phase, which is proportional to the frequency $f_2$ of the oscillation waveform W2), an oscillation waveform generated by the fans 3-1 and 3-2, which are simultaneously rotating, is presented as following equation (4). In FIG. 17B, the oscillation waveform generated by the fans 3-1 and 3-2 is depicted as an oscillation waveform W3.

$$A \sin \phi_1 + A \sin \phi_2 \qquad (4)$$

In this case, applying the additive theorem of trigonometrical function under the conditions of $\phi_1 = f_1 \cdot 2\pi x$ and $\phi_2 = f_2 \cdot 2\pi x$ (x denotes a variable depending on space coordinate, time coordinate, and propagation rate of the wave), the equation (4) can be replaced to the following equation (5).

$$2A \cos\{(f_1-f_2)\pi x\} \sin\{(f_1+f_2)\pi x\} \qquad (5)$$

When an absolute value $|f_1-f_2|$ of the difference between the frequency $f_1$ and frequency $f_2$ is enough small compared with each frequencies $f_1$ and $f_2$, $\sin\{(f_1+f_2)\pi x\}$ in the equation (5) can be replaced as $\sin(f_1 \cdot 2\pi x)$ or $\sin(f_2 \cdot 2\pi x)$.

Therefore, the oscillation waveform W3 presented by the equation (5) can be taken as a sinusoidal wave having an amplitude of $2A \cos\{(f_1-f_2)\pi x\}$. In FIG. 17B, the sinusoidal wave is illustrated as an oscillation waveform W4 (having a frequency $f_{diff}$). For human, the change of an amplitude component of the oscillation waveform W4 is perceived as a noise (beat) hurting ears. This noise and vibration are increased when the resonance point frequency $f_{RES}$ (an oscillation waveform W5 illustrated in FIG. 17C as an example) of the package 12 and the oscillation waveform W4 (having the frequency $f_{diff}$) correspond to each other. In the fifth preferred embodiment, the controller 2D re-decides the revolution levels of the fans 3-1 and 3-2 so that the frequency $f_{diff}$ and the resonance point frequency $f_{RES}$ of the package 12 do not correspond to each other. As a result, the noise and vibration resulting from the beat can be reduced.

Figure 18:
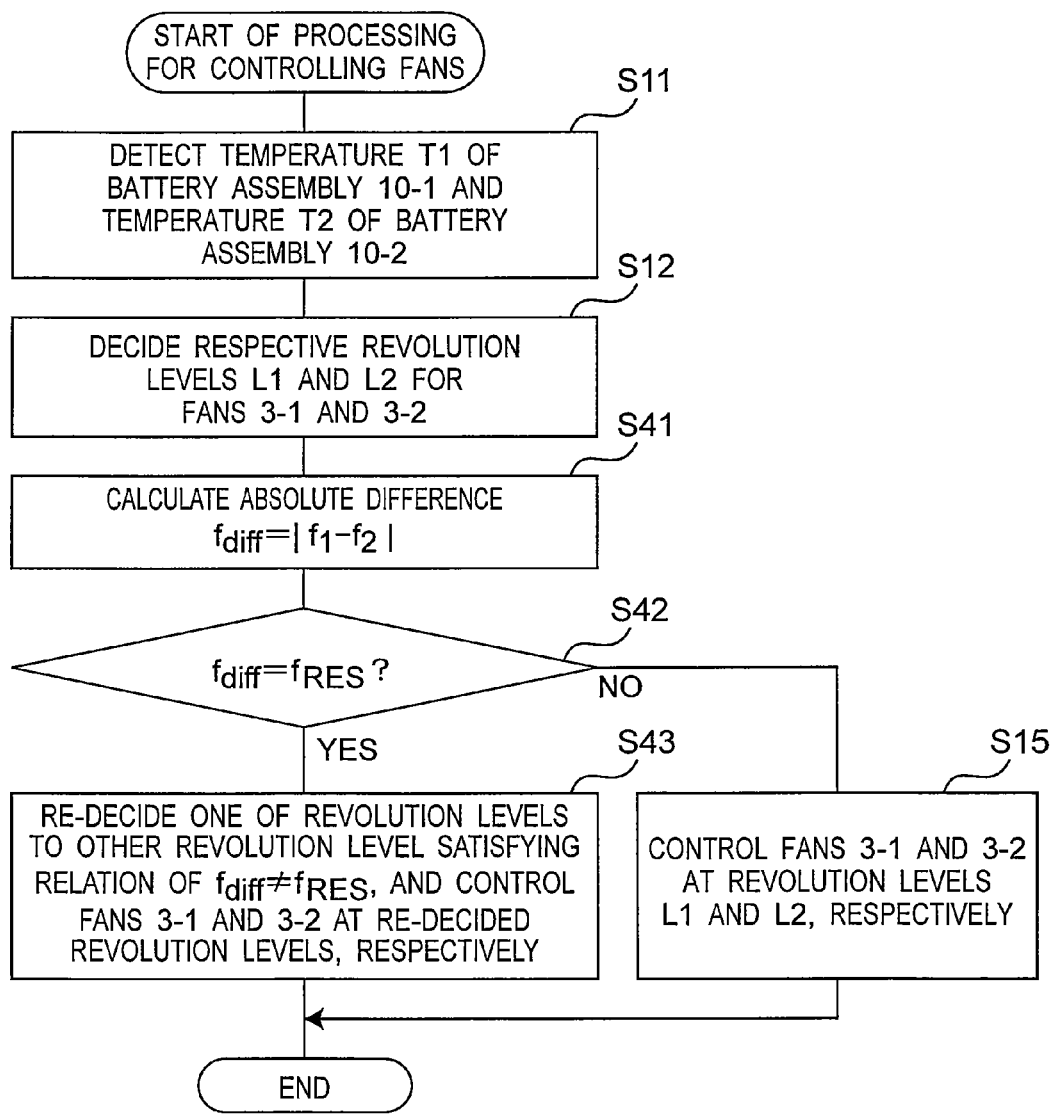
FIG. 18 is a flow chart showing a processing for controlling the fans 3-1 and 3-2 of the battery pack apparatus 1D according to the fifth preferred embodiment.

FIG. 18 is a flow chart showing a processing for controlling the fans 3-1 and 3-2 of the battery pack apparatus 1D according to the fifth preferred embodiment. At step S11 in FIG. 18, in the battery pack apparatus 1D on electric charging (or on electric discharging), the temperature detector 5-1 reads out the temperature T1 of the battery assembly 10-1 detected by the temperature sensor 4-1. The temperature detector 5-2 reads out the temperature T2 of the battery assembly 10-2 detected by the temperature sensor 4-2.

At step S12, the controller 2D decides the optimum revolution level L1 for the fan 3-1 depending on the temperature T1 of the battery assembly 10-1 using the temperature-revolution level table 22 of FIG. 7A. The controller 2D also decides the optimum revolution level L2 for the fan 3-2 depending on the temperature T2 of the battery assembly 10-2 using the temperature-revolution level table 23 of FIG. 7B. The operations of the controller 2D are the same as those of the controller 2A of FIG. 6 according to the second preferred embodiment as shown in FIG. 8 so far.

At step S41, the controller 2D calculates the absolute value $|f_1-f_2|$ of the difference between the frequency $f_1$ generated by the rotation of the fan 3-1 and the frequency $f_2$ generated by the rotation of the fan 3-2 as an oscillation frequency $f_{diff}$. At step S42, the controller 2D reads out the resonance point frequency $f_{RES}$ of the package 12 from the storage unit 6D, and compares the resonance point frequency $f_{RES}$ with the oscillation frequency $f_{diff}$ calculated at step S41. If $f_{RES}=f_{diff}$ at step S42, the control flow proceeds to step S43. On the other hand, if $f_{RES} \ne f_{diff}$ at step S42, the control flow proceeds to step S15.

At step S43, the controller 2D re-decides one of the revolution levels L1 and L2 to the other revolution level, which satisfies the relation of $f_{diff} \ne f_{RES}$, and control the fans 3-1 and 3-2 at the re-decided revolution levels L1 and L2, respectively. For example, when the fans 3-1 and 3-2 are rotated at the revolution levels "3" and "4", respectively, and when the oscillation frequency $f_{diff}$ is equal to the resonance point frequency $f_{RES}$, the controller 2D changes the revolution level of the fan 3-1 to the revolution level "5". At step S15, the controller 2D drives the fans 3-1 and 3-2 at the revolution levels L1 and L2, respectively.

According to the above-mentioned configuration, in the battery pack apparatus 1D having one fan for each of the two battery assemblies 10-1 and 10-2, a composite oscillation frequency ($f_{diff}$) of the oscillation frequencies generated by the rotation of the two fans 3-1 and 3-2 does not correspond to the resonance point frequency ($f_{RES}$) of the package 12. As a result, according to the battery pack apparatus 1D of the fifth preferred embodiment, in the battery pack apparatus with a plurality of fans, the beat generated by a plurality of fans, which are simultaneously rotating, can be reduced, and therefore, the noise and vibration can be reduced.

In addition, in the fifth preferred embodiments, the revolution level of at least one of the two fans 3-1 and 3-2 is changed to the other revolution level when the composite oscillation frequency $f_{diff}$ generated by the rotation of the two fans 3-1 and 3-2 corresponds to the resonance point frequency $f_{RES}$ of the package 12. However, practically, it is preferred that the revolution level of at least one of the two fans 3-1 and 3-2 is changed to the other revolution level when the composite oscillation frequency $f_{diff}$ is in a predetermined range including the resonance point frequency $f_{RES}$ of the package 12.

Further, in the fifth preferred embodiments, the controller 2D controls the revolution levels L1 and L2 of the fans 3-1 and 3-2 so that the oscillation frequency $f_{diff}$ generated by rotation of a plurality of fans 3-1 and 3-2 does not correspond to the resonance point frequency $f_{RES}$ of the package 12. However, the present invention does not intend to limit to this operation. The revolution levels may be previously set in the revolution level definition table 20 stored in the storage unit 6D so that any two frequencies $f_A$ and $f_B$ among the oscillation frequencies generated by the fans rotating at the respective revolution levels 1 to 6 and the resonance point frequency $f_{RES}$ of the package 12 have a relation of the following equation (6). In this case, it is possible to avoid that the oscillation frequencies generated by rotation of a plurality of fans corresponds to the resonance point frequency $f_{RES}$ of the package 12, without a complicated control of the controller 2D.

$$|f_A - f_B| \ne f_{RES} \qquad (6)$$

Still further, in the fifth preferred embodiments, the two fans 3-1 and 3-2 for feeding medium to the two battery assemblies 10-1 and 10-2, respectively, are provided as medium feeding parts. However, the present invention does not intend to limit to this configuration. The configuration can be applied to the configuration of the first preferred embodiment (a configuration in which two fans are provided for a single battery assembly) or the configuration of the third and fourth preferred embodiments (a configuration in which one fan is provided for each of three battery assemblies). In this case, the same effect as in the fifth embodiment can be obtained. In addition, by combining the fifth preferred embodiment to the other preferred embodiments, the beat generated by a plurality of fans, which are simultaneously rotating, can be prevented.

In the first to fifth preferred embodiments, the fans are the medium feeding parts for feeding the cooling medium to at least a battery assembly and a neighborhood thereof to cool down the battery assembly. However, the present invention does not intend to limit to this configuration. The fans may feed warm air or the like to warm the battery assembly. In this case, the fans feed warm air to the battery assembly and a neighborhood thereof to raise the temperature of the battery assembly to a temperature of supposed usage environment utilizing the heat generated by an engine or the like of a hybrid electric vehicle, for example, in a cold environment or climate. The present invention can also adjust to raise the temperature of the battery assembly as well as to lower the temperature thereof.

In addition, in the first to fifth preferred embodiments, each fan is provided at a neighborhood of a exhaust vent for the cooling medium of the cover of the battery pack apparatus, and the fans let the cooling medium in the cover exhaust outside of the cover. However, the present invention does not intend to limit to this configuration. Each fan may be provided at a neighborhood of an inlet for the cooling medium (or a medium feeding direction of the fans may be set in the opposite direction), and the fans let the cooling medium in the cover from outside of the cover. It goes without saying that the same effect as in the first to fifth preferred embodiments can be obtained.

The present invention can be used as a battery pack apparatus for use in electric vehicles, such as an pure electric vehicle (PEV) driven by only secondary batteries, a hybrid electric vehicle (HEV) having secondary batteries and an engine, a hybrid electric vehicle having secondary batteries and fuel cells, and the like.

The disclosure of Japanese Patent Application No. 2005-130531 filed Apr. 27, 2005 including specification, drawings and claims is incorporated herein by reference in its entirety.

Although the present invention has been described with respect to its preferred embodiments in some detail, the disclosed contents of the preferred embodiments may change in the details of the structure thereof, and any changes in the combination and sequence of the component may be attained without departing from the scope and spirit of the claimed invention.

What is claimed is:

1. A battery pack apparatus comprising:
   at least one battery assembly including at least one secondary battery connected in series;
   a plurality of medium feeding parts for feeding medium to said battery assembly and a neighborhood thereof to adjust a temperature of at least a part of said battery assembly;
   at least one temperature detector for detecting a temperature of said battery assembly;
   a storage unit for storing a relation between a temperature of said battery assembly and a revolution level indicating a relative level of a revolution of said medium feeding parts, wherein said storage unit further stores a resonance point frequency of a package of the battery pack apparatus which packs at least one battery assembly therein; and
   a controller for receiving the temperature of said battery assembly detected by said temperature detector, reading out a revolution level corresponding to the temperature of said battery assembly from said storage unit, and allocating the revolution level to said plurality of medium feeding parts,
   wherein when all of the revolution levels allocated to said respective medium feeding parts are substantially equal to each other, said controller controls said plurality of medium feeding parts so that a revolution level that is different from the value of the all same revolution levels is sequentially selected in each predetermined time by at least one medium feeding part, and
   wherein said controller changes the revolution level of at least one of the plurality of medium feeding parts when an absolute value of a difference between oscillation frequencies of the medium feeding parts corresponding to the revolution levels of any two of said plurality of medium feeding parts is in a predetermined range including the resonance point frequency stored in the storage unit.

2. A battery pack apparatus comprising:
   at least one battery assembly including at least one secondary battery connected in series;
   a plurality of medium feeding parts for feeding medium to said battery assembly and a neighborhood thereof to adjust a temperature of at least a part of said battery assembly;
   at least one temperature detector for detecting a temperature of said battery assembly;
   a storage unit for storing a relation between a temperature of said battery assembly and a revolution level indicating a relative level of a revolution of said medium feeding parts, wherein said storage unit further stores a resonance point frequency of a package of the battery pack apparatus which packs at least one battery assembly therein; and
   a controller for receiving the temperature of said battery assembly detected by said temperature detector, reading out a revolution level corresponding to the temperature of said battery assembly from said storage unit, and allocating the revolution level to said plurality of medium feeding parts,
   wherein when at least two of the revolution levels allocated to said respective medium feeding parts are substantially equal to each other, said controller controls said plurality of medium feeding parts so that a different revolution levels from each other are sequentially selected in each predetermined time by the respective medium feeding parts, and
   wherein said controller changes the revolution level of at least one of the plurality of medium feeding parts when an absolute value of a difference between oscillation frequencies of the medium feeding parts corresponding to the revolution levels of any two of said plurality of medium feeding parts is in a predetermined range including the resonance point frequency stored in the storage unit.

3. A battery pack apparatus comprising:
   at least one battery assembly including at least one secondary battery connected in series;

a plurality of medium feeding parts for feeding medium to said battery assembly and a neighborhood thereof to adjust a temperature of at least a part of said battery assembly;

at least one temperature detector for detecting a temperature of said battery assembly;

a storage unit for storing a relation between a temperature of said battery assembly and a revolution level indicating a relative level of a revolution of said medium feeding parts, wherein said storage unit further stores a resonance point frequency of a package of the battery pack apparatus which packs at least one battery assembly therein; and a controller for receiving the temperature of said battery assembly detected by said temperature detector, reading out a revolution level corresponding to the temperature of said battery assembly from said storage unit, and allocating the revolution level to said plurality of medium feeding parts, wherein said controller changes the revolution level of at least one of the plurality of medium feeding parts when an absolute value of a difference between oscillation frequencies of the medium feeding parts corresponding to the revolution levels of any two of said plurality of medium feeding parts is in a predetermined range including the resonance point frequency stored in the storage unit.

* * * * *